(12) United States Patent
Attarwala

(10) Patent No.: US 7,194,318 B2
(45) Date of Patent: Mar. 20, 2007

(54) INTEGRATED OPTIMIZATION AND CONTROL USING MODULAR MODEL PREDICTIVE CONTROLLER

(76) Inventor: Fakhruddin T Attarwala, 1 Bellaire Dr., Princeton, NJ (US) 08540

( * ) Notice: Subject to any disclaimer, the term of this patent is extended or adjusted under 35 U.S.C. 154(b) by 515 days.

(21) Appl. No.: 10/768,803

(22) Filed: Jan. 31, 2004

(65) Prior Publication Data

US 2005/0075738 A1   Apr. 7, 2005

(51) Int. Cl.
  *G05B 13/02*   (2006.01)
  *G05B 15/02*   (2006.01)
  *G05B 19/18*   (2006.01)
  *G06F 7/60*    (2006.01)

(52) U.S. Cl. .............. 700/29; 700/9; 700/44; 700/45; 700/28; 703/2

(58) Field of Classification Search ........... 700/29, 700/44, 28, 45, 9; 703/2
See application file for complete search history.

(56) References Cited

U.S. PATENT DOCUMENTS 6,064,809 A * 5/2000 Braatz et al. ............... 703/2
6,122,555 A * 9/2000 Lu .............................. 700/9
6,381,505 B1 * 4/2002 Kassmann et al. ......... 700/44

* cited by examiner

*Primary Examiner*—Anthony Knight
*Assistant Examiner*—Sunray Chang
(74) *Attorney, Agent, or Firm*—David A. Guerra

(57) ABSTRACT

A modular formulation of model predictive controller is proposed by this invention (400). The modular formulation offers a robust model predictive controller with unified method of tuning. Explicit use of material and energy balance provides stable and robust performance (412). Use of economic based tuning offers a unified tuning method (411). The unified tuning method establishes consistency of control actions resulting from the steady state optimization and the dynamic control (400). Further, a method for formulating and tuning integrated optimization and control using multiple modular model predictive controllers is presented in this invention (100). The method incorporates a direct and explicit method of integration of a number of modular model predictive controllers. The integration of the modular controllers is achieved seamlessly without requiring any further tuning adjustments (200). The resulting integrated system of multiple modular predictive controllers performs robustly, permitting each of the modular model predictive controllers to perform its role in the context of the state of operation of rest of the system. The proposed integration can be made to include lower level modular controllers or at same level controllers or both (300).

32 Claims, 28 Drawing Sheets

Example: Flash Column

| LogicalName | Proc ssVariable | Description | EngUnit | MPC | MX-MPC |
|---|---|---|---|---|---|
| | Manipulated | | | | |
| MV1 | MXFIC_01SP | Top Reflux Flow Controller Set Point | MBLD | Included* | Included |
| MV2 | MXTIC_03SP | Feed Temperature Controller Set Point | degF | Included | Included |
| MV3 | MXFI_05SP | Feed Flow Controller Set Point | MBLD | Included | Included |
| | FeedForward | | | | |
| FV1 | MXAI05_PV | Feed Quality | %mole | Included | Included |
| | Controlled | | | | |
| CV1 | MXAI_20PV | Overhead Product Purity | %mole | Included | Included |
| CV2 | MXPDI_21PV | Column Pressure Differential | psia | Included | Included |
| CV3 | MXAI_22PV | Bottom Product Purity | %mole | Included | Included |
| CV4 | MXFI_07PV | Top Product Flow | MBLD | Included | Included |
| CV5 | MXFI_06PV | Bottom Product Flow | MBLD | Included | Included |
| CV6 | MXFIC_01OP | Top Reflux Flow Controller Output | % | Included | Included in LP but not in Controller |
| CV7 | MXTIC_03OP | Feed Temperature Controller Output | % | Included | Included |
| CV8 | MXLIC_05OP | Top Level Controller Output | % | Included | Included in LP but not in Controller |
| CV9 | MXLIC_06OP | Bottom Level Controller Output | % | Included | Included in LP but not in Controller |

Included     Included both in LP and Dynamic Controller

Fig 5

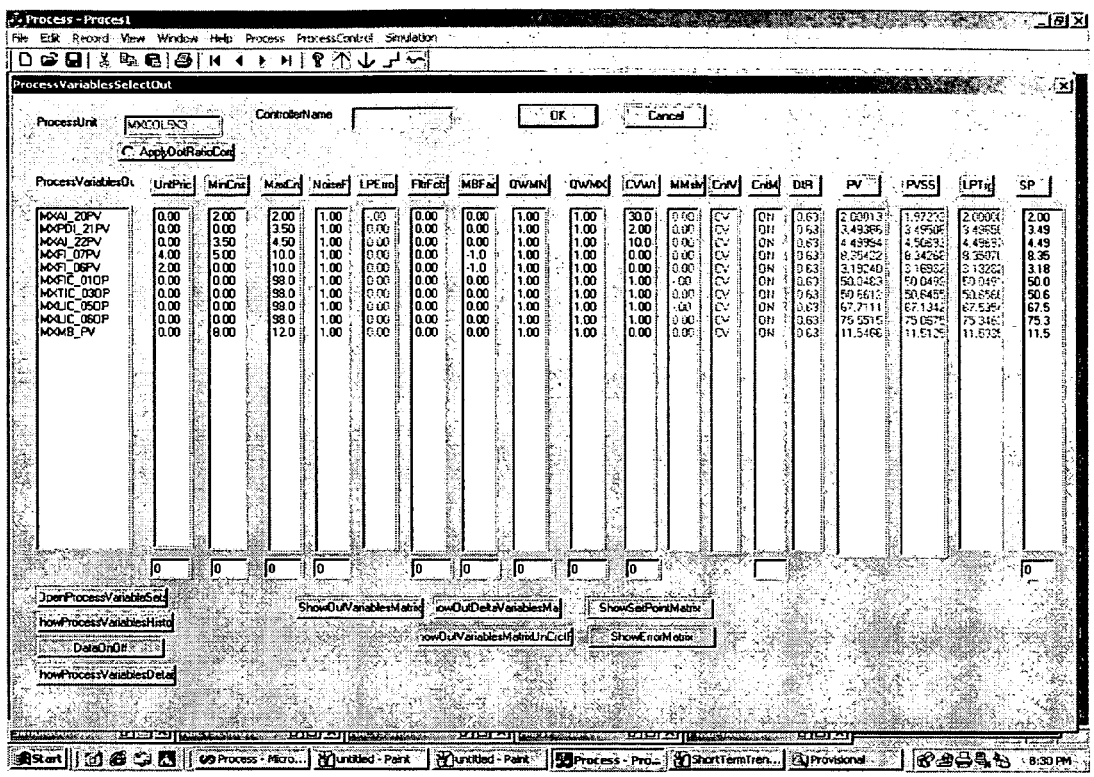
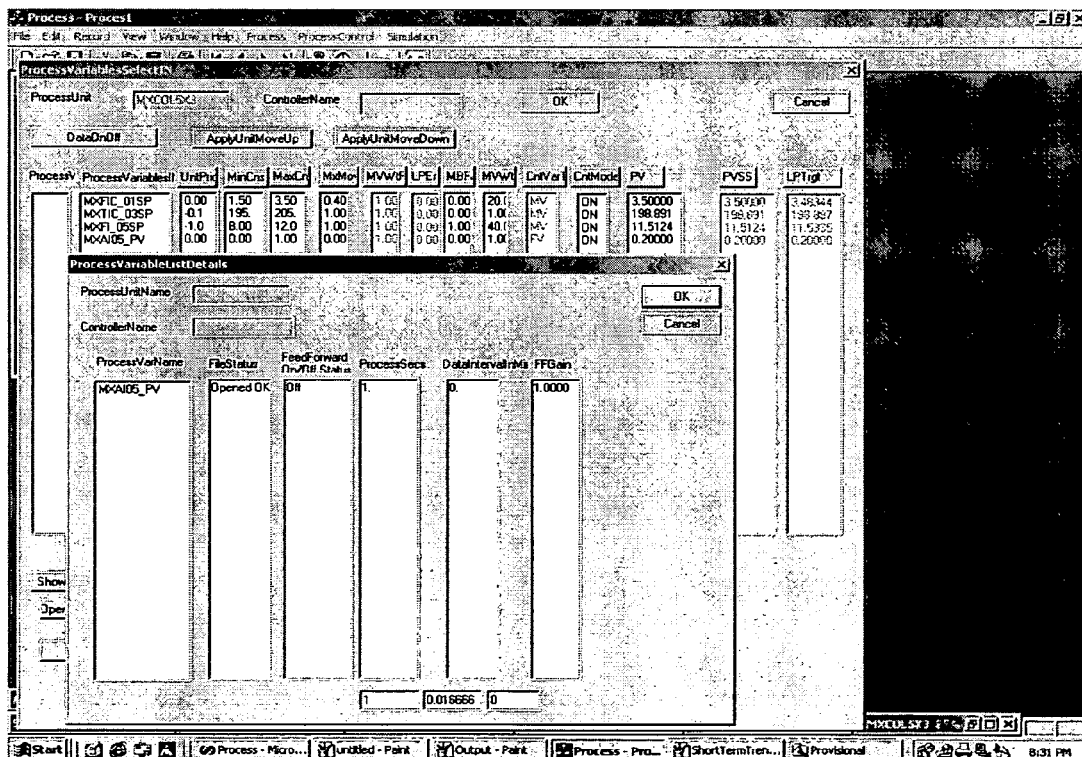
Fig7

Perf rmance of MPC
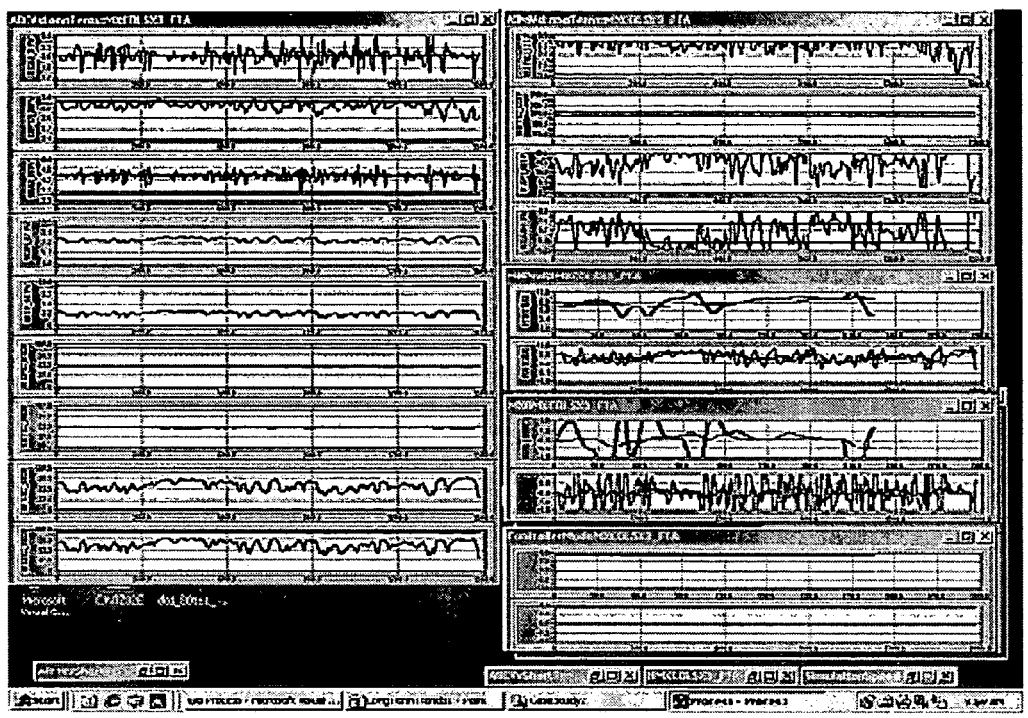
Performance of MX-MPC
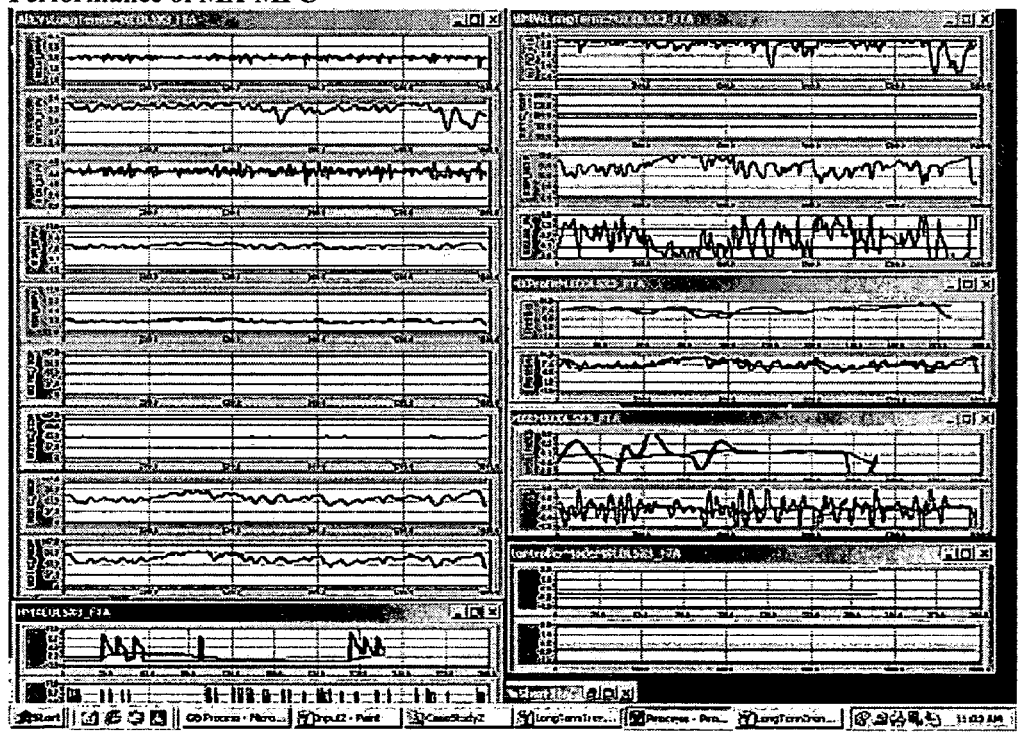
Fig 14

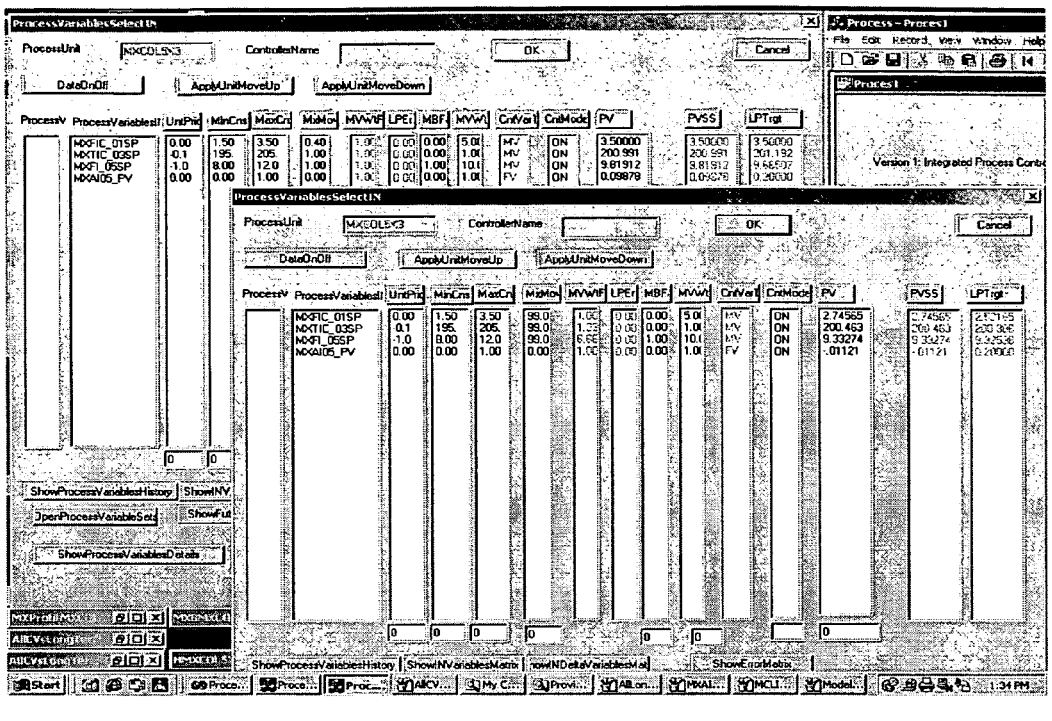
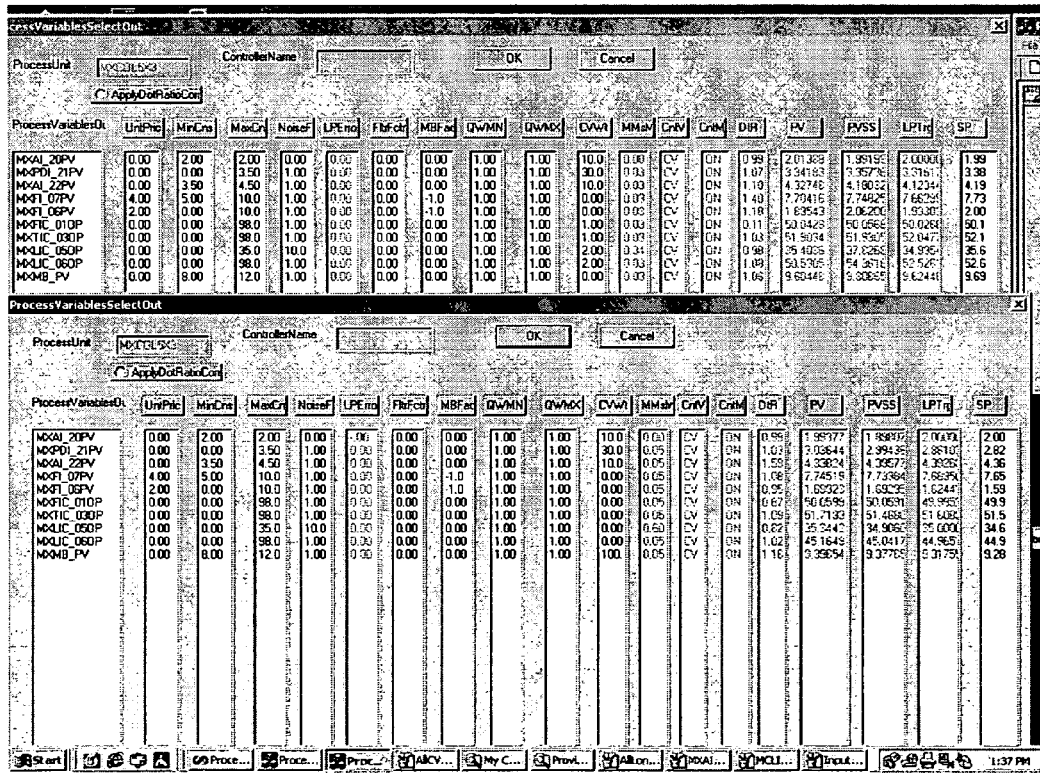
Fig 16

Performance of MPC                Performance of MX-MPC
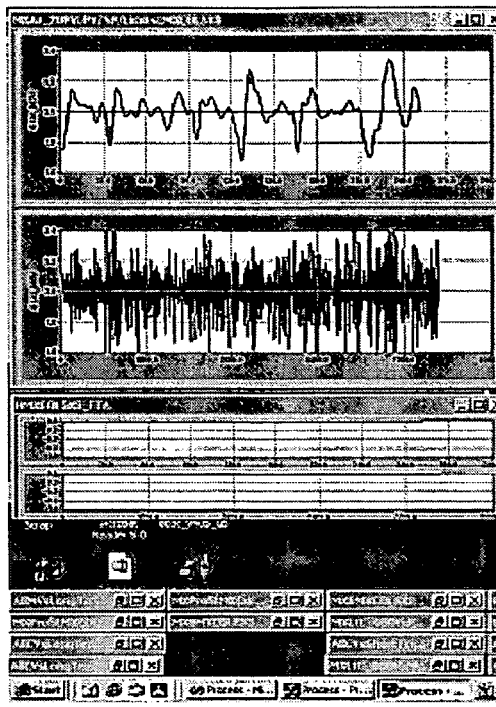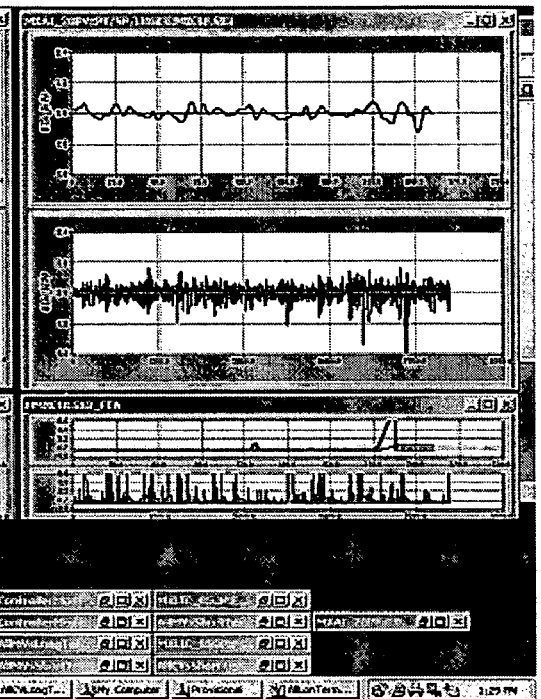
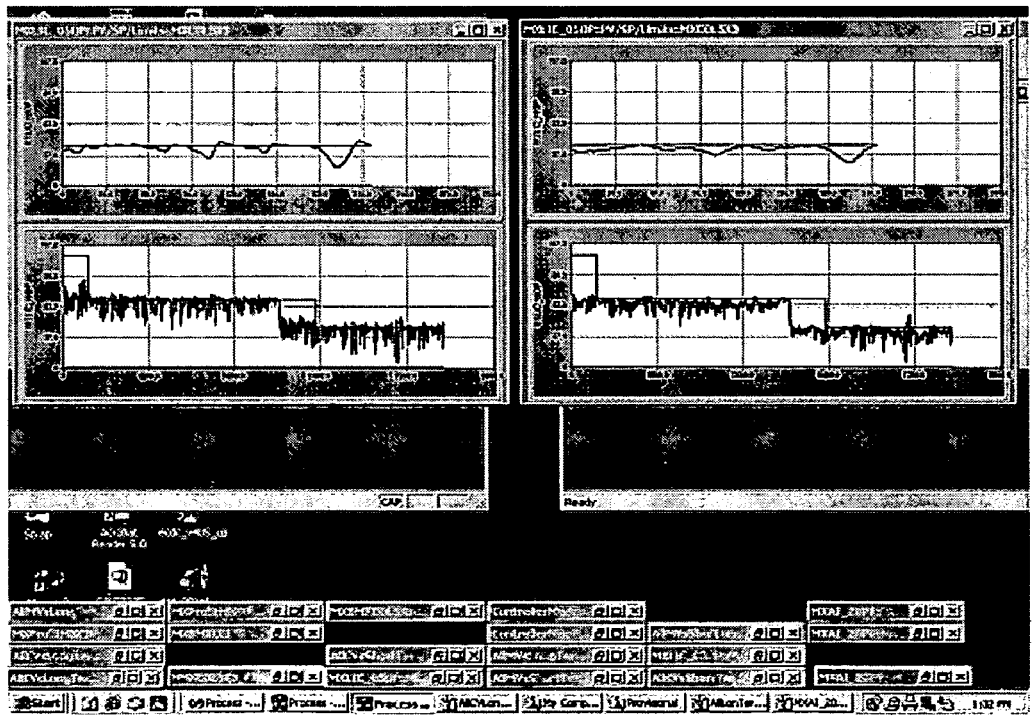
Fig 17

Input Variables Details

Output Variables Details

Fig 19

Model Gains

| ModelName | MXFIC_01SP | MXTIC_03SP | MXFI_05SP | MXFI_10SP | MXAI! |
|---|---|---|---|---|---|
| MXAI_20PV | -0.4 | 0.31 | 0.52 | 0.00 | 0.23 |
| MXPDI_21PV | 0.28 | 0.15 | 0.25 | 0.00 | -.02 |
| MXAI_22PV | 0.19 | -0.5 | -0.1 | 0.00 | 0.46 |
| MXFI_07PV | -0.1 | 0.01 | 0.30 | 0.00 | -0.1 |
| MXFI_06PV | 0.10 | -.01 | 0.70 | 0.00 | 0.10 |
| MXFIC_01OP | 0.05 | 0.00 | 0.00 | 0.00 | 0.00 |
| MXTIC_03OP | 0.00 | 0.10 | 0.00 | 0.00 | 1.86 |
| MXLIC_05OP | -5.0 | 0.50 | 15.0 | 0.00 | -5.0 |
| MXLIC_06OP | 2.14 | -0.2 | 15.0 | 0.00 | 5.00 |
| MXTIC_03PV | 0.00 | 0.00 | -27. | 11.0 | 0.00 |

| E | ModelName | MX | MX | MX | M | MXAI05_PV | MXTI_03PV |
|---|---|---|---|---|---|---|---|
| | MXAI_20PV | -0.4 | 0.31 | 0.52 | 0.00 | 0.23 | 0.00 |
| | MXPDI_21PV | 0.28 | 0.15 | 0.25 | 0.00 | -.02 | 0.00 |
| | MXAI_22PV | 0.19 | -0.5 | -0.1 | 0.00 | 0.46 | 0.00 |
| | MXFI_07PV | -0.1 | 0.01 | 0.30 | 0.00 | -0.1 | 0.00 |
| | MXFI_06PV | 0.10 | -.01 | 0.70 | 0.00 | 0.10 | 0.00 |
| | MXFIC_01OP | 0.05 | 0.00 | 0.00 | 0.00 | 0.00 | 0.00 |
| | MXTIC_03OP | 0.00 | 0.10 | 0.00 | 0.00 | 1.86 | 0.00 |
| | MXLIC_05OP | -5.0 | 0.50 | 15.0 | 0.00 | -5.0 | 0.00 |
| | MXLIC_06OP | 2.14 | -0.2 | 15.0 | 0.00 | 5.00 | 0.00 |
| | MXTIC_03PV | 0.00 | 0.00 | -27. | 11.0 | 0.00 | 1.00 |

INTEGRATED OPTIMIZATION AND
CONTROL USING MODULAR MODEL
PREDICTIVE CONTROLLER

CROSS REFERENCE TO RELATED
APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention relates to the field of real time optimization and control using Model Predictive Controller. More particularly, the present invention relates to integration of model predictive controllers for a large process unit, its sub-processes including regulatory controllers for robust performance.

2. Description of Prior Art

Model Predictive Control has been applied to a wide range of processes, to a simple unit operation to plant unit operation involving multiple unit operations. However, quality of performance of Model Predictive Controller (MPC) as practiced in the art varies considerably with the size of its application; tuning and design can take considerable engineering effort.

As practiced in the art, tuning of a MPC is a trial and error endeavor that works well under a narrow and defined range of operation, depending on the severity of disturbances and the degree of model uncertainty present, the controller tuning requires frequent updating. In other words, performance of MPC lacks robustness for sustained improved profitability of process operation under changing conditions. This problem is exacerbated as the size of application increases.

Tuning of a MPC is primarily oriented towards individual variable based tuning in isolation of other variables. This approach does not lend itself towards a simple and unifying way of controlling stability of the process under control. The piecemeal approach to setting tuning of the controller makes the controller susceptible to wide range of performance degradation depending on the extent of disturbance effects as well as model mismatch effects. Thus, tuning developed under one set of conditions are often not appropriate for different set of conditions. Consequently, performance of a MPC can be erratic and in the worst case, requiring continual tuning changes.

In the prior art, attempts have been made to link multiple MPCs for a large process unit albeit with limited success. One such approach used in practice is what is generally known as "Composite LP" method in which a number of MPCs are linked via an overall LP for steady state optimization whilst individual MPCs perform their respective dynamic move actions. This approach requires extensive engineering efforts to build and maintain such a system. Another approach that has been mentioned in practice relate to U.S. Pat. No. 6,122,555. In this approach, an attempt has been made to link a number of MPCs for steady state optimization but with addition of seeking an amalgamated solution of dynamic move calculation and steady state optimization. Both these two approaches have been tried to solve the problem of linking multiple MPCs by addition of refinements of optimization on top of basic MPC lacking its own robustness.

Although both these above-mentioned approaches offer a solution to the underlying problem of building and maintaining large-scale model predictive controller(s), however, they do not tackle the problem fully and satisfactorily. Both these approaches attempt to offer solution to large-scale integration without any changes either to the basic structure of Model Predictive Control or the methodology of its application. Both of these approaches are built upon a basic structure of Model Predictive Control that has its own shortcomings and weaknesses.

For most part, in practice most efforts have been spent in trying to improve the robustness of performance by improving the accuracy of the models used in the controller. In practice, not all process instability can be attributed solely to modeling error as often bad tuning also induces closed loop instability. Recently, in patent U.S. Pat. No. 6,381,505 an attempt has been made to account explicitly model uncertainty in steady state target calculation for improved robustness of the controller performance. This method solves the problem of cycling in the steady state controller due to modeling error. However, apparently, it would not help when there are no modeling errors and cycling is due to bad controller tuning.

What is needed in the art is a more robust base level Model Predictive Control that can be intergraded as a part of a large-scale application whilst maintaining its own performance. In addition what is needed in the art is a simple and powerful method of building and maintaining be it small size or large size model predictive controller be it on a small unit operation or on a large integrated process operations as a whole that would consistently deliver robust performance.

SUMMARY OF THE INVENTION

To address, the above-mentioned deficiencies of the prior art, it is a primary object of the present invention to provide robust control and stable optimization of processes of all sizes and scope.

Therefore, there is provided by the present invention, a direct and explicit method of setting tuning values for manipulated variables and controlled variables. The unified method of tuning provides consistent tuning that can be used under changing controller conditions. Accordingly, it is an object of the present invention to provide a more robust controller for a process control system.

Further, there is provided by the present invention, a method of integrating a multitude of the modular model predictive controllers for a range of processes, from a process of one manipulated variable and one controlled variable to any higher number of manipulated variables and controlled variables.

Therefore, there is provided in the present invention a modular model predictive controller that can easily be integrated as the scope of the process increases whilst maintaining overall stability of the process and continue to optimize overall profitability of operation.

BRIEF DESCRIPTION OF DRAWINGS

The foregoing and other features and aspects of the subject invention will be best understood with reference to a detailed description of the method, which follows, when read in conjunction with the accompanying drawings and the results of the case studies included therein.

In the accompanying drawings:

FIG. 7 Case Study 1: Data

FIG. 14 Case Study 3: Results: Comparison of Performance of MX-MPC with MPC

FIG. 16 Case Study 4: Data Continued

FIG. 17 Case Study 4: Results: Comparison of Performance of MPC and MX-MPC

FIG. 19 Case Study 6: Data

FIG. 20 Case Study 6: Data Continued

REFERENCE NUMERALS IN DRAWINGS

100 Integrated Optimization and Control
200 Modular Model Predictive Controller
300 Modular Model Predictive Controller Next Level Down
400 Modular Model Predictive Controller
411 Modular Dynamic Controller
412 Modular Steady State Optimizer
500 Model Predictive Controller (Prior Art).

DETAILED DESCRIPTION OF THE PREFERRED EMBODIMENTS

Figure 1:
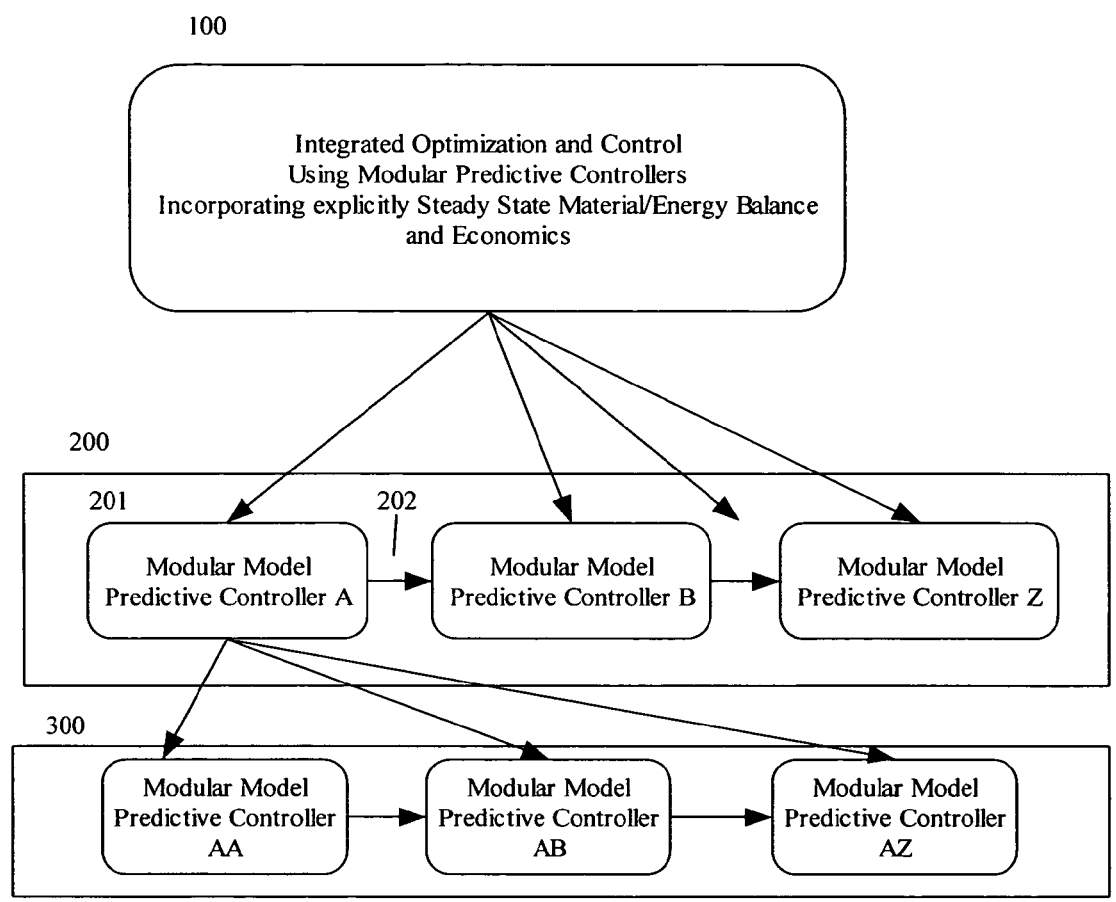
FIG. 1 is a block diagram showing a constitution of a Large Scale Integrated Modular MPC system according to a first embodiment of the present invention.

Description-FIG. 1 Preferred Embodiment

Figure 2:
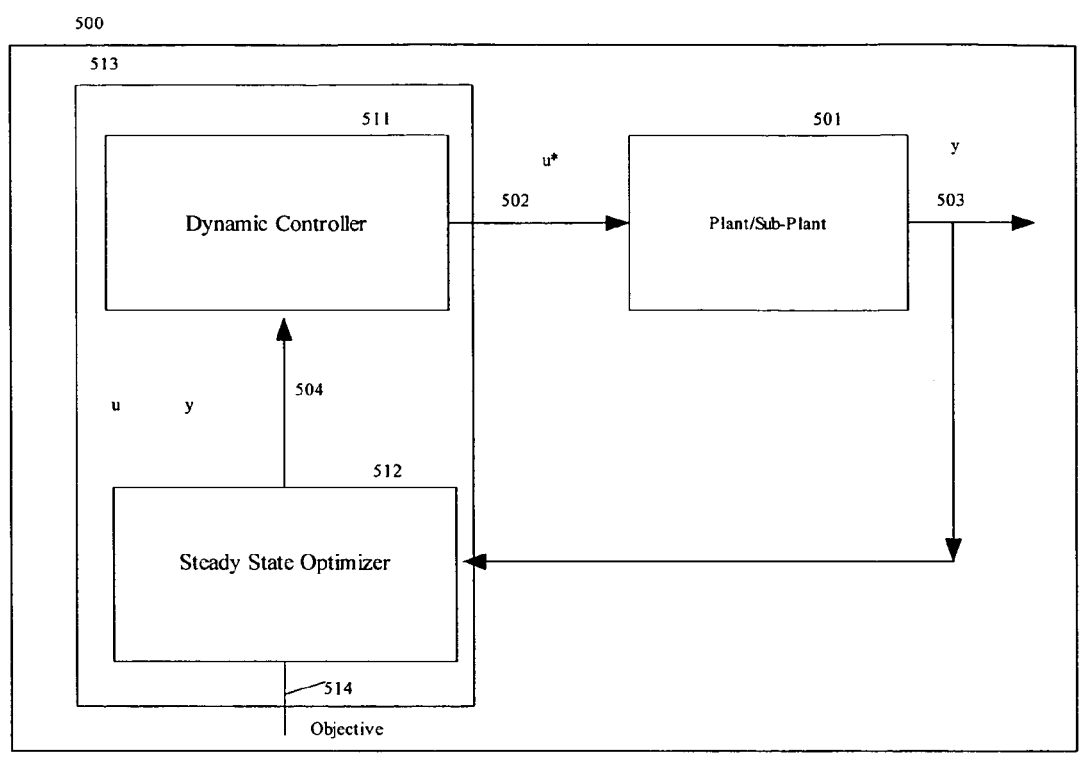
FIG. 2 is a block diagram of a MPC system as practiced in the art.
Figure 3:
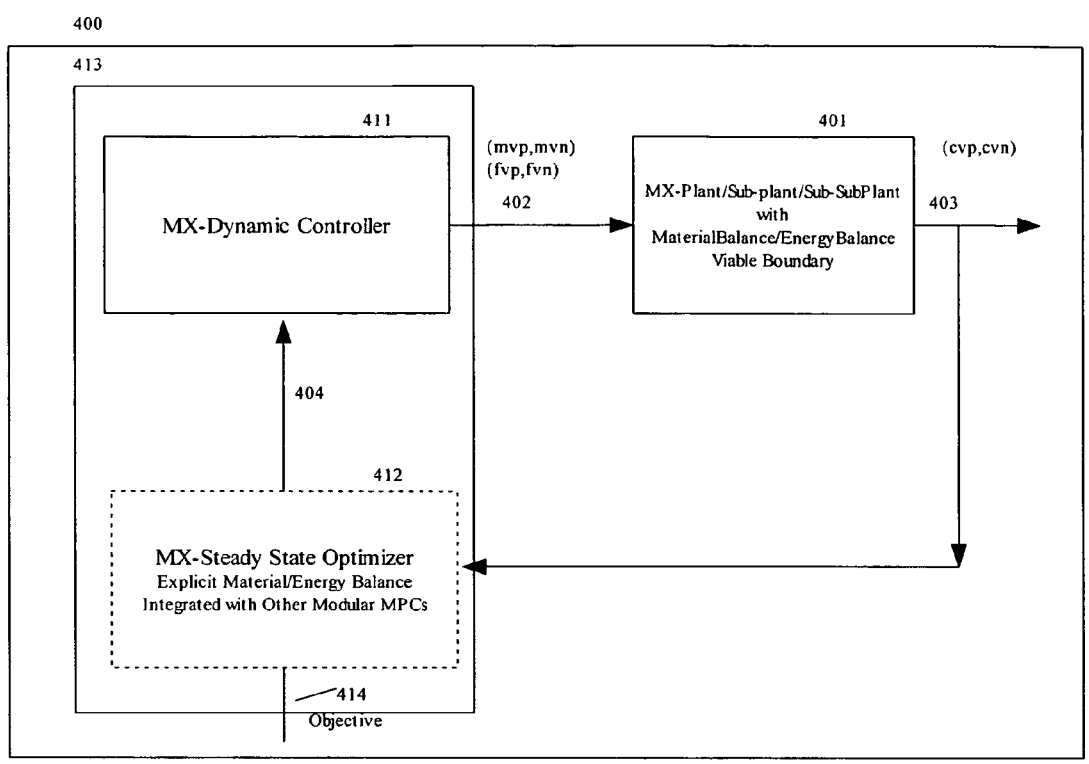
FIG. 3 is a block diagram of a Modular MPC as per the invention.

FIG. 1 represents a preferred embodiment of the invention presented herein. In FIG. 1, there is shown in block diagram form a set of integrated modular MPCs (hereafter refereed to as MX-MPCs). In FIG. 2 is shown structure of a MPC (prior-art) as practiced in the art, contrasting it, in FIG. 3 is shown a Modular MPC (MX-MPC). As shown in FIG. 3, a MX-MPC will have its own dynamic controller relating to the manipulated variables and the controlled variables within its scope of control. As a stand alone, the MX-MPC will have a MX-steady state optimizer 412 which can easily be integrated as a part of an integrated steady state optimizer. As shown in FIG. 1, steady state optimizer integrates MX-steady state optimizer 412 of FIG. 2 for each of the MX-MPCs in box 200 and in turn each of the MX-MPCs in box 300 FIG. 1.

The line 202 in FIG. 1 represents interconnectivity of the MX-MPCs. The exact mapping of the interconnectivity of the MX-MPCs would depend on the underlying process topology.

Referring to FIG. 2, there is shown in block diagram form an implementation of as practiced in the art Model Predictive Control, MPC. Hereafter, as practiced in the art Model Predictive Control will be referred to as MPC. As apparent from FIG. 2, MPC block 513 is divided into a stead-state calculation and a dynamic calculation. A "plant" is also represented by block 501. The term "plant" is intended to refer to any of variety of systems, such as chemical processing facilities, oil-refining facilities.

In the interest of clarity, not all features of actual implementations of a MPC controller are described in this specification. References cited herein 1–5 provides the basic details of specification and operation of as practiced in the art, Model Predictive Control.

The dynamic MPC calculation has been studied extensively (see e.g., S. J. Qin and T. A. Badgwell, "An Overview of Industrial Model Predictive Control Technology", in Fifth International Conference on Chemical Process Control, J. C. Kantor, C. E. Garcia, and B. Caranhan, Eds., No. 93 in AIChE Symposium Series 316, 1997, pp. 232–256). The goal of the steady state MPC calculation is to recalculate the targets for the dynamic controller 511, every time the MPC controller 513 executes, because disturbances entering the system or new input information from the operator may change the location of the optimal steady state. This separation of the MPC algorithm into a steady-state and dynamic calculation was alluded to, for example, by C. Cutler, A. Morshedi, and J. Haydel, "An Industrial Perspective on Advanced Control", AlCheE National Meeting Washinton, D.C., 1983 and is now common in industrial MPC technology.

Breifly, the overall system depicted in FIG. 2, comprising as practiced in the art, MPC 513 and plant 501, operates as follows: MPC 513 performs dynamic and steady-state calculations to generate control signals reflecting optimal "inputs", u* to plant 501. Inputs u* to plant 501 on line 502. Thus, line 502 in FIG. 2 is representative of what would be, in "real-world" application of MPC technology, a plurality of electrical control signals applied to controlled components (valves, for example) to control a plurality of controlled variables, y (pressures, flow rates, temperatures, for example) within the plant.

On the other hand, the plant 501's operation is symbolically represented in FIG. 2, by a plurality of "outputs" y which are represented in FIG. 2 as being carried on a line 503, thus line 503 is representative of a plurality of electrical signals reflecting the operational status of plant 501.

As shown in FIG. 2, output(s) y are fed back to be provided as inputs to steady-state target calculation block 512. Steady-state target calculation block 512 operates to generate so-called "target" inputs and outputs, u and y, respectively, as a function of plant output(s), y and as a function of an "objective" which is symbolically represented in FIG. 2 as being carried on a line 514. The target inputs u and outputs y are represented in FIG. 2 as being carried on line 504. Target inputs u are those inputs to plant 502 which, based on the calculations made by calculation block 513, are expected based on the MPC modeling of plant 501, to result in plant 501 operating to produce the target y.

Typically, the steady state optimizer uses a steady-state version of the dynamic process model used for the dynamic controller move calculation. The recalculated optimal steady state is then passed to the dynamic controller. The stead-state target calculation for linear MPC, represented by block 512 in FIG. 2, takes the form of a linear program ("LP").

Description-FIG. 3 Additional Embodiments

Turning now to FIG. 3, there is shown a MPC with differences from a MPC in FIG. 2. The MPC in FIG. 3 is referred to as a Modular MPC for the reasons that would become clear from the detailed description of it herein. The operation of MX-MPC in FIG. 3 is same as that of MPC in FIG. 2 except that the contents and details contained within boxes 412, 411 and 401 are different from corresponding boxes 512,511 and 501 in FIG. 2. The above-described description of operation of MPC relates verbatim to operation of MX-MPC with the first digit of the numerals references of FIG. 2 being replaced with 4. However, the differences between MPC and MX-MPC arise from the contents of the boxes.

To begin with, the scope of the process under control in box 401 is based on what is described later on as viable boundary of material balance/energy balance and therefore it is termed herein as modular process/sub-process. Consequently, the steady state optimizer, 412 in FIG. 3 is formulated differently than the steady state optimizer 512 in FIG. 2 and it is termed herein as MX-Steady State Optimizer. As shown, in FIG. 3, it incorporates explicitly what is described later as inequality constraints of "Controlled Imbalance of steady state material/energy balance" pertaining to the scope of process/sub-process in box 401 in addition to all of the constraints generally included as part of the steady state optimizer 512 in FIG. 2. Furthermore, for a stand alone MX-MPC, the MX-steady state optimizer 412 would be included within the operation of the MX-MPC. Whereas, for an integrated MX-MPC, the MX-steady state optimizer 412 would be included within an integrated steady state optimizer combining steady state optimization operation of a plurality of MX-MPCs as shown in FIG. 1.

The key characteristic of process 401 in FIG. 3 is that the scope of MX-MPC would include all of the pertinent viable material/energy balance boundaries within. In some cases, this may be just as simple as one material balance boundary involving in flow and one out flow around an accumulator or in another case, it will be a heat balance around a furnace for heat in flow and heat out flow. As will be evident from the detailed description later, the material balance or heat balance (hereon for sake of brevity energy balance and heat balance will be interchanged as equivalently) need not be complete in the strict sense, but to the extent that the variables which relate to either of the balances must be scoped together. Partial balances for lack of process measurements are still workable albeit with loss of performance within the framework of the proposed invention.

The material/energy balances contained within the scope of the process under control shown of process 401 in FIG. 3 as described later would be represented "Controlled Imbalance" constraints in the MX-steady state optimizer 412 of FIG. 3.

As per the invention, MX-steady state optimizer 412 of FIG. 3 can be part of a separate stand alone MX-MPC for the process 401 of FIG. 3, or it can be part of an integrated steady state optimizer for all of the integrated MX-MPC of the types as shown in FIG. 3 for various processes and sub-processes and so on.

Those of ordinary skill in the art would appreciate that real processes are linked together by way of material flows and energy flows; feed is converted into intermediate products and in turn intermediate products form feed to intermediate processes leading ultimately to end products. The conversion of feed to intermediate products to end products requires application/removal of energy. Thus, a network of material flows and energy flows span the entire process operation. The method of invention proposed herein follows the material flows and energy flows to scope Modular Model Predictive Controllers (MX-MPCs). Naturally, the MX-MPCs are linked together by way of the network of material flows and energy flow. Thus, integration of MX-MPCs is inherently defined by the very method of scoping them. Although the scope of MX-MPCs will be process dependent but the methodology for scoping them is not. Therefore, the present invention offers a way of scoping MX-MPCs consistently across a number of processes and therefore permitting a large scale integration of control and optimization across the entire production chain/network, from feed to intermediate products to end products consistently. As it will be evident later, such a method produces a robust process control system for the entire process as well as for sub-processes as well.

Those of ordinary skill in the art will appreciate where such material/energy balance boundaries can be defined within a process and its sub-processes. For example, at a micro level, a heat balance boundary can be drawn relating to feed preheat temperature controller which will include fuel gas as source of heat and feed as sink of heat.

In the interest of clarity, not all features of actual implementations of MX-MPC controller are described in this specification. Instead, the key characteristics of the invention as distinct from as practiced in the art, MPC are described. It will of course be appreciated that in the development of any such actual implementation, as in any such project, numerous engineering and programming decisions must be made to achieve the developer's specific goals and sub goals (e.g. compliance with system and business related constraints), which will vary from one implementation to another. It will be appreciated that such a development effort might be complex and time-consuming, but would be a routine undertaking for those of ordinary skill in the field of controller system design having the benefit of this disclosure.

As used in the industry (chemical engineering), the term "material balance" describes the process of identifying all of the flows entering and leaving a process which are directly involved in a certain physical separation or chemical reactions. Furthermore, it relates to quantifying and measuring these flows over a time period to balance the total of inflows to outflows of a particular material or its components. It is generally understood that under steady state conditions of operation of the unit, the total of inflows will equate the total of outflows. Whereas, under non-steady state conditions, the difference of the total of inflows and the total of outflows represents what is termed herein as "material imbalance".

As used in the industry (chemical engineering), the term "Energy balance" describes the process of identifying all of the energy entering and leaving a process unit which are directly involved in a certain physical separation or chemical reactions. Furthermore, it relates to quantifying and measuring these energy flows over a time period to balance the total of inflows to outflows. It is generally understood that under steady state conditions of operation of the unit, the total of inflows will equate the total of outflows. Whereas, under non-steady state conditions, the difference of the total of inflows and the total of outflows represents what is generally known as energy gain/loss in the unit and termed herein as "energy imbalance". In process industry, primarily source of energy is heat and therefore for the purpose of describing this invention, heat balance will be used.

For the sake of exposition, we will focus on material balance to begin with. However, the same ideas apply equally to energy balance. For instance, where we refer to "inflows" and "outflows" for material balance, one can use "inflow" of energy and "outflow" of energy for energy balance. Thus, we will primarily limit the exposition to material balance, though the invention is not limited to material balance only.

By way of further background, Model Predictive Controllers use what is generally known in the art as "flow control valve output" or "level control valve output" to control and optimize performance of a process unit in addition to inflow variables and outflow variables. However, inflows and outflows used in a Model Predictive Controller are selected primarily to control one or more outflows by manipulating one or more inflows. The flow control valve outputs and/or level control valve outputs associated with the inflows and outflows are included in the controller for "process constraints". These outflows are controlled and constrained individually but not collectively as per overall material balance around the process unit as proposed in the invention. Thus, as practiced in the art, a MPC seldom includes all of the process inflows and outflows to perform explicit material balance and even if they are, they are not collectively controlled together as per overall material balance around the unit.

As practiced in the art, a MPC typically includes a set of what is known as "Process Response Models" representing time varying value of a process output variable change in time in response to a step change in a process input variable when the process is at steady state.

The invention applies to any form of models used in implementation of the controller of FIG. 2, linear or non-linear. For the purpose of exposition herein, dynamic response models will be used.

Process constraints determine the limits of operating range of a process unit. Process Output variables relate to the product flows and their properties such as density, boiling point, purity etc. They may also include the state of the process equipment capacity such as control valve output, level in an accumulator or pressure. These variables characterize the state of the process and are used for setting the physical limits to which the equipment and/or the process is allowed to operate. Thus, for each of the process input variables and output variables, low and high limits are set within which the controller is required to operate the unit or otherwise minimize the violation of the limits.

The controller thus includes a set of interrelated process models and constraints set. The results of the controller to derive the process from current state to the desired/optimal state by manipulating the appropriate variables.

Depending on the controller tuning and the manner and magnitude of changes in both measured and unmeasured feed forward variables as well as the dynamics of the process itself, the actual attainment of process state will deviate from the desired or optimal state.

The details concerning formulation of the proposed modular model predictive controller is presented below. First, the formulation is presented in terms of characterization of the variables. Second, the basis of optimization including most importantly how the economic pricing is to be represented including the overall optimization strategy adopted for finding material balance and energy balance stable optimal solution. Finally, presenting the details how dynamic controller control move calculation is done especially, ensuring that a unified method of tuning is carried through from the optimization level to the control move calculation level.

As per the invention, scoping of a MX-MPC is crucial. Scoping of a MX-MPC is to be based on a viable material/energy balance boundary. A viable material balance boundary is defined as one in which the variables measurements are sufficient to do a material balance. Depending on the process variables involved, the material balance could relate as overall balance or as component level balance.

Similarly, a viable energy balance is defined as one in which the variables measurements are sufficient to do an energy balance. In practice, in process industry application, energy balance is more commonly relates to heat balance.

Within the scope of a MX-MPC mentioned above, there can be more than one material/energy balance boundaries. Thus, the scope of a MX-MPC can be as large or as narrow as desired but must always constitute of viable material/energy balance boundaries.

In addition to viable material and/or energy balance variables, a MX-MPC may include variables that are required to characterize the operating limits such as control valve outputs, or equipment safety such as skin temperature limit etc.

The variables within the scope of a MX-MPC are characterized as follow for modular formulation that would permit seamless integration later. The variables are characterized based on whether a variable is explicitly and directly related to production of products and profitability of process operation.

Manipulated Variables, Controlled Variables and Feed Forward Variables of a MX-MPC are characterized as follows, Product Related Variables, such as feed, product draw, feed quality, product quality etc. All of the variables explicitly and directly relating to product will be referred to as $v^p$.

Non-Product Related Variables, such as quench water, heater by-pass flow, bed temperature, tower differential pressure etc. All of the variables not explicitly and directly relating to product will be referred to as $v^n$.

Based on the above characterization, a modularly formulated MX-MPC would have the following set of variables $mv^p$, $cv^p$ and $fv^p$ for product related Manipulated Variables, Controlled Variables and Feed Forward Variables respectively mv″, cv″ and fv″ for non-product related Manipulated Variables, Controlled Variables and Feed Forward Variables respectively.

In FIG. 3, the above-characterized variables are shown on their respective lines. Furthermore, for constraint optimization each of the variables in the controller scope would have the following range defined as:

Normal Range: This is the range in which the variable is required to be kept by the operator of the controller High Penalty Range: an extended range beyond normal high limit, in which a penalty is to be applied if the variable is to violate the high limit Low Penalty Range: an extended range beyond normal low limit, in which a penalty is to be applied if the variable is to violate the low limit.

For product related variable, there would be economic values given for the three ranges mentioned above. As it will be shown later, for non-Product related variables, the economic values for the three ranges would be derived from the interconnected product related variables.

Typically, for product related variables, normal range economics are known or given. For most part, High Penalty range economic penalty is also known or given, though often not readily available. For instance, for product quality variable such as RVP of a distillate in a refinery process, its economic value for normal range may be set at $2.0 per barrel of distillate. However, if the actual distillate RVP is to be higher than the normal range high value, then its economic penalty could be set at $0.20 per barrel of the distillate. In which case, when the distillate RVP is to violate normal high value, the optimizer will use $1.8 per barrel as the economic value for the distillate in the High Penalty Range. This will become evident later from the details to follow.

Both High Penalty Range and Low Penalty Range can be considered to be of varying size and penalties to accommodate non-linear relationships.

For the constrained optimization, the optimization problem is stated as follows, $$J(v, p) \quad 1.1$$

Max J

In Model Predictive Control system with linear models, objective function J is of the form $$J = p_i v_i \quad 1.1.1$$

Where v is set of Variables within the scope of the controller
p is the economic price associated with v
Subject to $$v >= 0 \quad 1.2$$

$$v_{min} <= v <= v_{max} \quad 1.3$$

Where
$v_{min}$ is the low limit of process variables, v
$v_{max}$ is the high limit of process variables, v.

In addition to constraints 1.2 and 1.3, as per the invention, for MX-MPC the constraints set will include the following material balance constraints.

$$-h^j <= MB^j(v_m^j) <= h^j \quad 1.4$$

Where
j>=1 depending on number of viable material balance boundaries within the scope of MX-MPC.

$h^j$ is the amount of permissible "controlled imbalance" in the $MB^j$ $v_m^j$ is a sub set of v relating to the $MB^j$.

Similarly, as per the invention, for MX-MPC the constraints set will include the following energy balance constraints.

$$-h^k <= HB^k(v_h^k) <= h^k \quad 1.5$$

Where
k>=1 depending on number of viable heat balance boundaries within the scope of MX-MPC.

$h^k$ is the amount of permissible "controlled imbalance" in the $HB^k$ $v_h^k$ is a sub set of v relating to $HB^k$.

The form of objective function J in eqn 1.1.1 is meant to be illustrative and the constraints set 1.2 and 1.3 as illustrative of the standard formulation. The present invention is primarily about incorporation of the Controlled Imbalance Inequality constraints of type 1.4 and 1.5 in the optimization formulation. Also, reference to heat energy in describing the invention is meant to be interchangeable with energy in its general meaning.

By design of a MX-MPC, there will at least be one MB and/or one HB boundary relating to the scope of the controller.

In eqn 1.5, H refers to energy in general or heat energy specifically. For the purpose of exposition, hereon, H will be used interchangeably as heat energy.

The variables v are further classified as independent and dependent variables. Independent variables are considered inputs to the process and dependent variables are outputs of the process. Thus, $$[v] = [u, y] \quad 1.5.1$$

$$y = g(u) \quad 1.5.2$$

where g( ) is process based relationship defining steady state changes in y for changes in u. One particular form of g( ) which is commonly used is that of linear form, that is $$y = Gu \quad 1.5.3$$

The matrix G is generally termed as process gains matrix. Eqn 1.5.3 is a linear characterization of u and y. In a non-linear application, g( ) above would be more involved function involving the variables concerned.

Economic pricing of u variables is expected to be available knowing the process. However, some of y variables would be product related and therefore their economic pricing ought to be available knowing the process. This leaves the variables in y, which are not product related directly such as control valve outputs, column differential, etc. Therefore, y is further classified as for the purpose of economic pricing $$[y] = [y^p, y''] \quad 1.5.4$$

Similarly, $$[u] = [u^p, u''] \quad 1.5.5$$

Typically, when y″ remains within its low/high limits, it is of no direct economic consequence. It becomes of economic consequence only when it violates its low/high limits, for example if a safety related y″ such as maximum skin temperature is violated then it would be of great economic consequences and therefore it would have large economic penalty value when it violates its high limit. Again, this would be determined knowing the process. Thus, for most part, in the normal range of operation, $y^n$ would have zero economic value and therefore $$p_i(v_i^n)=0 \text{ when not violating low/high limit}$$

$$p_i(v_i^n)=-p_h \text{ when violating high limit} \quad 5$$

$$p_i(v_i^n)=p_l \text{ when violating low limit} \quad 1.6$$

The proposed invention includes an overall optimization strategy residing in MX-steady state optimizer 412 in FIG. 3. stated as below.

Step 1: Optimization is done to satisfy constraints 1.2–1.5 with normal low/high limits. This yields a MB and HB stable optimal solution. Under relatively stable operation, constraints 1.4 & 1.5 would be satisfied along with constraint 1.2 & 1.3 indicative of stable but optimizing condition. However, if any of these constraints is not satisfied then proceed to step 2 else exit normally.

Step 2: Failing Step 1, alternate solution would be to find a MB and HB feasible solution but incurring constraint penalty for the controlled variables violating its low/high limits. Basically, this would mean relaxing the constraint range of some of the controlled variables as necessary, either be product make related and/or product quality related and/or any of the control valve output and/or any of the equipment safety variable. This would involve the following steps.

Re-solve the optimization problem but with all of the constraint limits of variable y wide open (i.e. normal range set to 0 to 999999). This would result in a feasible optimal solution. The optimal solution is noted and is used to set for each of y variable, their constraint penalty range with respect to the nearest limit to the optimal solution obtained.

With the constraint penalty range set as above, the optimization problem is re-solved. However, this time, it will result in the trade-offs as per the constraint penalty pricing. That is to say, for instance, this would result in trade-off of one or more product quality related $y^p$ and yet satisfying the MB and HB stability constraints. If this solution is feasible, no further solution is sought.

If the above solution fails then the optimization problem is re-solved as the step except that this time both MB and HB are relaxed. The solution thus obtained is noted. Based on the results of this solution, speed of optimization is determined as per the constraint limits of MB and HB respectively (see eqn 1.4 and 1.5).

As stated above, the above method of setting economic pricing and overall optimization solution strategy would work for a linear plant system or a non-linear plant system as well.

The formulation presented above as per the invention differs from as practiced in the art in the following ways.

Modular MPC employs economic price/cost comprehensively in conjunction with constraint violation penalty pricing for all of the variables. In contrast, as practiced in the art employs an unstructured method of using economic price for some of the variables and for others employs what is generally termed as "Control Variables Weight" or "Control Variable Equal Concern Weight" based on undefined but subjective assessment of the engineer or operator. There is no method for reconciling use of economic price with use of the weights.

Modular MPC optimization solution is predominately material balance and energy balance stable solution even if it means incurring an economic penalty to do so. The economic penalties are consistently defined with other economic prices. Thus, in arriving at a feasible solution when violating constraints, the solution remains economically optimal, though at sub-optimal value. In contrast, as practiced in the art optimization is neither predominately material balanced nor energy balanced solution stable. Instead, it predominately strives to seek economic optimal solution with no regard to any consideration of maintaining stability of the process. Furthermore, when it cannot attain a feasible optimal solution, it uses the so-called weights with no explicit and direct economic basis to arrive at feasible but non-economic optimal solution.

The dynamic controller 511 (see FIG. 2) of a MPC calculates control move actions of manipulated variables to be applied as per the setpoint of the controlled variables determined by the steady state optimizer 512. Typically, the dynamic move calculation is calculated based on least square error minimization with no strictly binding constraints. Relative weights are used for both manipulated variables and controlled variables to influence the control move calculation in the desired direction.

As practiced in the art, the tuning weights used for dynamic move calculation are either the same as those used in the optimization or some other but of similar values. There is no structured method to set these weights. Instead, they are set on an ad-hoc basis initially and re-tuned based on actual performance feedback. Essentially, it is a trial and error approach.

A unified method of setting tuning for the controller move calculation 411 is presented below that works with the tuning used in the steady state optimizer 410. Typically, in a MPC, controller moves calculation is based on a least square error minimization solution with added constraint of sum of moves equal to the optimization set target. The general solution of this is well described in refs 1–5. For the sake of exposition of the invention presented herein, it suffices to summarize the solution of calculation of dynamic move, U as $$u=f(e,u^*,b,c) \quad 2.0$$

Where u is manipulated variable vector u* is manipulated variables target as determined by the optimization e is controlled variable error vector, pv-sp* pv is predicted future value of controlled variables sp* is controlled variable target as determined by the optimization is dynamic response models of the controlled variables with respect to the manipulated variables, as a response matrix consisting of dynamic models b is manipulated variables weight vector c is controlled variables weight vector u is change in manipulated variables in future, the first move being the current move f( ) is based on a least square error minimization one particular form of f( ) is $$f(\ )=(A^TCA+B)^{-1}e \quad 2.01$$

where,

A is generally known as controller matrix generated from the dynamic models coefficients and augmentation of sum of dynamic moves equal to the steady-state target of the manipulated variables.

$A^T$ is transpose matrix of A

C is what is generally known as controlled variables weight matrix derived from c.

B is what is generally known as manipulated variables weight matrix derived from b.

e is error vector namely as sp-pv, where sp is set point vector for the controlled variables and pv is predicted process value vector for the controlled variables augmented with the vector of manipulated variables target—manipulated variable current value.

As practiced in the art, the weight vector B and C are set by the practitioner based on practical experience of operation of the process. Nevertheless, these weights are at best based on the understanding of the process, devoid of any structured basis. Typically, they are set initially based on a few simulation studies to ascertain expected outcomes of action in different scenarios of constraint violations and conflicts. However, they are not often updated easily. Therefore, for most part these tuning values remain unchanged except when a significant problem arises in that the controller actions do not jibe with the particular process conditions. In which case, these weights are adjusted only after the fact. They will be changed once again when something else goes wrong. Furthermore, as practiced in the art, for most part, the weight vectors, B & C do not bear any direct relationship to the economic pricing used in the optimization or the controller models used.

For the proposed modular model predictive control (as per FIG. 3), c weight vector in eqn 2 can be directly related to the economic pricing used in the optimization solution as follow.

Thus, for a controlled variable i, $$c_i = cf_i * p_i \qquad (2.1)$$

Where $p_i$ is the value as returned from the steady state optimizer 412.

$cf_i$ is user defined value, typically 1.0 but adjusted by the user for desired effect.

Thus, eqn 2.1 ties in the economic prices used for the controlled variables in the MX-steady state optimizer 412 in FIG. 3 with their tuning weights used in the MX-dynamic controller 411.

For a manipulated variable $u_i$, its tuning weight b is defined as follows:

$$b_i = bf_i * bn_i \qquad (2.2)$$

Where, $bn_i$ is nominal weight as per calculation below $bf_i$ is user set tuning adjuster, which is for most part equal to 1.0, but can be used adjusted when model gains used (see below) are uncertain.

$bn_i$, manipulated nominal weight is calculated based on the model gains and if applicable, material balance gain and energy balance gain of the manipulated variable.

$$bn_i = Max(Abs(g_{ji}), Abs(mki/h_k), Abs(e_{li}/H_l)) \qquad (2.3)$$

Where, $g_{ji}$ is controller model gains (j=1, number of controlled variables) with respect to manipulated variable, i.

$mk_i$ is material balance gain of manipulated variable, i. (k=1, NumberOfMaterial Balances)

$h_k$ is permitted material balance imbalance.

$e_{li}$ is energy balance gain of manipulated variable, i. (l=1, NumberOf EnergyBalances)

$H_l$ is permitted energy balance imbalance.

For a non-material balance manipulated variable, in eqn 23, the material balance gain would be obviously zero. Similarly, for a non-energy balance manipulated variable, in eqn 2.3, the energy balance gain would be zero as well.

Controller Model Gains, $g_{ji}$ are as per the models in use in the controller at the time. Thus, eqn 2.2 and 2.3 define manipulated variable weights used by the MX-dynamic controller 411 in FIG. 3.

As per the above proposed formulation, tuning weights for both controlled variables and manipulated variables are explicitly and directly derivable from the economic pricing used in the optimization, the material balance "controlled imbalance" control, the energy balance "controlled imbalance" control and the dynamic models used in the controller. This results in the tuning weights of all these variables to be consistent amongst them, thus ensuring that both the actions taken by the MX-dynamic controller 411 remain largely consistent with the direction of steady state optimization as determined by the steady state optimizer 412.

The tuning factors associated with the tuning weights are there simply to permit "fine-tuning". In fact, any deviation from value of 1.0 would be indicative of the underlying error in one or more of the values used in the calculation of tuning weights. Hence, it can be used to trouble-shoot erroneous gains. For instance, model mismatch error arising from the use of the control models, would require the tuning factor to deviate from the desired value of 1.0.

As per the invention, the scope of a MX-MPC of FIG. 3 is chosen to include a viable material balance and/or energy balance boundary. A viable material balance and energy balance process boundary is defined as one within which all of the process variables measurements are available which comprehensively and completely permit material balance and/or energy balance to be performed across the boundary. Thus, the process 401 in FIG. 3 is selected to correspond to a viable material and energy balance.

In an industrial process unit, a number of viable material balance and energy balance boundary can be drawn. These boundaries may relate to being applicable as being in overall material level or at component material level. For the purpose of exposition of this invention, though not limited to it, we will use overall material and energy balance.

Figure 4:
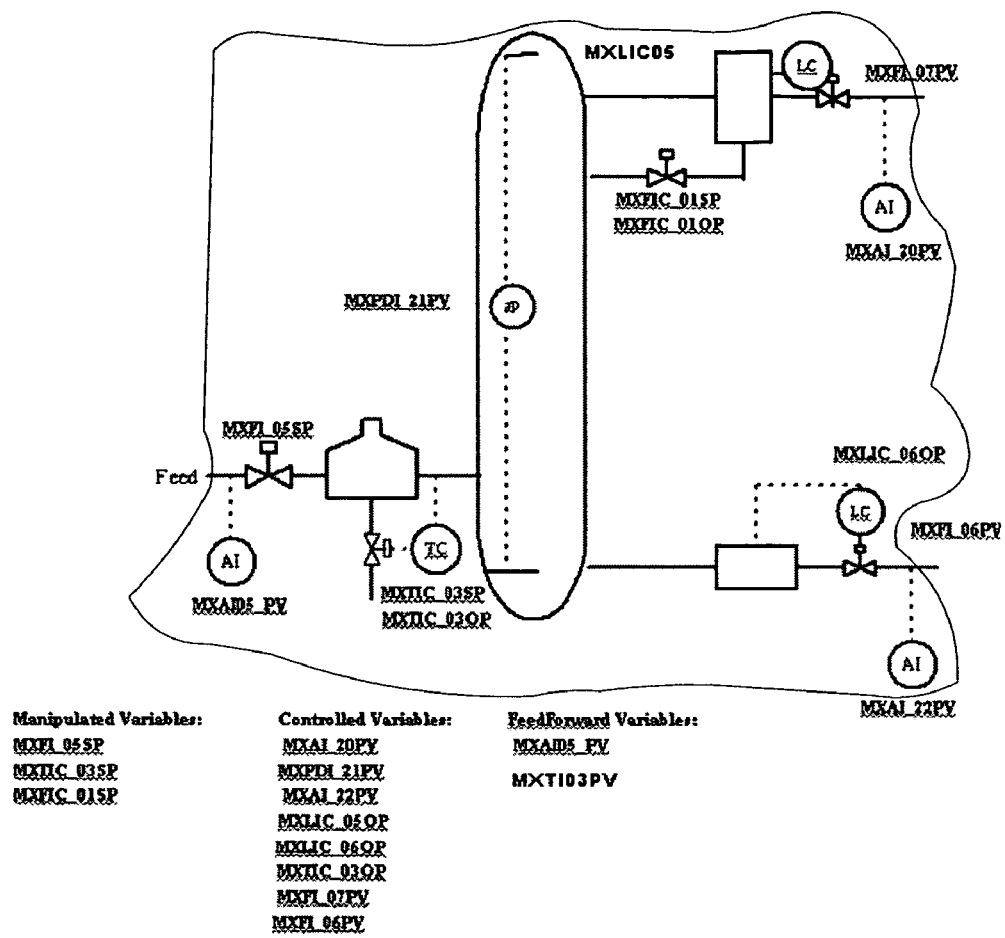
FIG. 4 depicts a flash column as an example for application of the invention with a viable material balance and heat balance boundary FIG. 5 lists all of the process variables pertaining to FIG. 4

In reference to FIG. 4, for a flash column, an overall material balance boundary is shown which primarily includes, feed rate, and two products draw rates. Further, for the purpose of exposition of formulation of the method proposed, hereon we will limit the description and the discussion to include material balance primarily. However, in principle, the invention applies equally to both material balance and energy balance. In practice, often-material balance is easier to apply than energy balance, as the latter requires additional process measurements and properties.

As stated earlier, it is assumed that the controller scope is chosen to have a set of process input variables and process output variables, which together will permit a viable material balance across the process boundary under control.

As an example of formulation of constraint 1.4, the material balance $v_h^k$ can be expressed $$MB^j(v_m^j) = \Sigma \rho i * Fi - \Sigma \rho o * Fo \qquad (3.0)$$

Where, $\rho$ refers to density of material. The inflows used in eqn 3.0 relate to the feed, other material streams, which combine to produce products and byproducts as outflows.

For the purpose of exposition, it is assumed that the flows in eqn 3.0 are of all same density or normalized. Hence, eqn3.0 simplifies to $$MB^j(v_m^j) = \Sigma Fi - \Sigma Fo = 0 \qquad 3.1$$

Hereon we will use eqn 3.1 for simplicity.

With regard to the controller, the variables in the set Fi are either manipulated variables or controlled variables and the same is assumed true of the variables in the set Fo. The eqn 3.1 can be incorporated as an equality constraint in a linear programming (LP) optimization algorithm or any other suitable optimization technique along with all of the other equality and inequality constraints as set forth above.

In order for eqn 3.1 be implemented in a constrained steady state optimizer (such as LP algorithm) under steady state condition and yet still permit the process to be manipulated as required, it is modified as an inequality constraint as follows.

$$-h^j <= \Sigma Fi - \Sigma Fo <= h^j \quad\quad 3.2$$

Where $h^j$, is a permissible imbalance of material around the chosen boundary. The value of $h^j$ is closely related to material holdup that can be held within the equipment. For instance, in a distillation column this would relate closely to the combined holdup of all elements such as trays and accumulators. Varying $h^j$ allows for faster or slower control actions but not exceeding too far from the maximum limit as determined by the internals of the process unit. Thus, a determinant limit can be established. Allowing the imbalance to approach this limit would induce operations instability. For instance, in a distillation column this would mean the degree of separation of the components would deteriorate rapidly as the imbalance gets too close to this high limit value. In physical terms, $h^j$ would have a value such as 50 barrels for a small distillation column and higher for a larger column.

A variant of eqn 3.2 relating only to either inflows or outflows instead be used, as follows $$-h^j/2 <= -\Sigma Fo <= h^j/2 \quad\quad 3.2.1$$

$$-h^j/2 <= \Sigma Fi <= h^j/2 \quad\quad 3.2.2$$

Where, $\Sigma$ Fo refers to sum of all changes in outflows. Eqn 3.2.1 replaces eqn 3.2 by what is termed herein as "Controlled Imbalance". Eqn 3.2 is incorporated as two inequalities 3.2.1 and 3.2.2 in the steady state optimizer 412.

Eqn 3.2–3.2.2 are included in addition to low/high limits constraints for all of the variables of the MX-MPC in MX-steady state optimizer 412 of FIG. 3. The exact details of these equations as applicable to different situations are illustrated below. In respect of the integrated control system of FIG. 1, eqn 3.2–3.2.2 corresponding to each of the MX-MPC are incorporated into one single integrated steady state optimizer 100.

Individual component material balance can explicitly be included in addition to overall material balance described above in the steady state optimizer 412, as follows:

$$-h_j <= \Sigma Fi_j - \Sigma Fo_j <= h_j \quad\quad 3.3$$

Where, $h_j$ refers to imbalance tolerance for component j of a multi-component flow $\Sigma Fi_j$ refers to sum of a flow of component j in all of inflows $\Sigma Fo_j$ refers to sum of a flow of component j in all of outflows $Fi_j$ refers to flow of component j in inflow stream i.

$Fi_j = Fi * x_j$ $x_j$ refers to composition of component j in the flow stream.

A variant of eqn 3.3 relating only to either inflows or outflows or both be used in place of eqn 3.3, as follows $$-h/2 <= -\Sigma Fo_j <= h/2 \quad\quad 3.3.1$$

$$h/2 <= \Sigma Fi_j <= h/2 \quad\quad 3.3.2$$

$$Fo_j = Fo_j - Fo_j^*$$

$$Fi_j = Fi_j - Fi_j^*$$

Where $Fo_j^*$ new steady state value to be determined by the optimizer of the outflow $Fo_j$ can be either current dynamic value or current predicted steady state value of the outflow $Fi_j^*$ new steady state value to be determined by the optimizer of the inflow $Fi_j$ can be either current dynamic value or current predicted steady state value of the inflow Eqn 3.3.1 and 3.3.2 are non-linear equations, however, as it will be evident later from the incorporation of heat balance related constraints, such non-linear equations can be handled albeit with some further detailed formulation. These equations are mentioned to illicit wider applicability of the basic concept relating to the material balance constraint in different forms and situations.

For energy balance, equation of the same form as eqn 3.2 can be incorporated such as follows.

$$-h^k <= \Sigma Hi - \Sigma Ho <= h^k \quad\quad 3.4$$

Where, Hi refers to enthalpy input, Ho refers to enthalpy output and H refers to permissible overall enthalpy loss or gain across the energy boundary.

Once again, two variant of eqn 3.3 can be used, $$-h^k/2 <= -\Sigma Ho <= h^k/2 \quad\quad 3.4.1$$

$$-h^k/2 <= \Sigma Hi <= h^k/2 \quad\quad 3.4.2$$

Where, $\Sigma$Ho refers to change in sum of all enthalpy outflows. As stated previously, eqn 3.4.1 relates to what is herein called "Controlled Imbalance" of enthalpy outflows. Another variant of eqn 3.4.1 can be used using $\Sigma$Hi. Depending on the availability of process data, either or both variant of eqn 3.4 can be used.

Eqn 3.4.1 and 3.4.2 can be reformulated as respectively, $$-h^k/2 <= -(\Sigma Ho - \Sigma Ho^*) <= h/2 \quad\quad 3.4.3$$

$$-h^k/2 <= \Sigma Hi - \Sigma Hi^* <= h^k/2 \quad\quad 3.4.4$$

Further as $$-h^k/2 + \Sigma Ho^* <= -\Sigma Ho <= h^k/2 - \Sigma Ho^* \quad\quad 3.4.5$$

$$-h^k/2 - \Sigma Hi^* <= \Sigma Hi <= h^k/2 + \Sigma Hi^* \quad\quad 3.4.6$$

Or more generically, as $$h^o_{low} <= -\Sigma Ho <= h^o_{high} \quad\quad 3.4.7$$

$$h^i_{low} <= \Sigma Hi <= h^i_{high} \quad\quad 3.4.8$$

Relating to eqn 3.4.7 and 3.4.8, the low and high limits pertaining to the inequality constraints are updated as follows based on the direction of optimization.

That is to say, the limits are expanded dynamically as follows,

If $\Sigma Ho^* > h^o_{high}$ then $h^o_{high} = -\Sigma Ho^* + h/2$ (Limit expansion)

Else $h^o_{high} = h^o_{high}$ (Unchanged)

Similarly,

If $\Sigma Ho^* < h^o_{low}$ then $h^o_{low} = -\Sigma Ho^* - h/2$ (Limit expansion)

Else $h^o_{low} = h^o_{low}$ (Unchanged)     3.4.9

If $\Sigma Hi^* > h^i_{high}$ then $h^i_{high} = \Sigma Hi^* + h/2$ (Limit expansion)

Else $h^i_{high} = h^i_{high}$ (Unchanged)

Similarly,

If $\Sigma Hi^* < h^i_{low}$ then $h^i_{low} = -\Sigma Hi^* - h/2$ (Limit expansion)

Else $h^i_{low} = h^i_{low}$ (Unchanged)     3.4.10

The above provides for dynamic expansion of the low/high limits as determined by the direction of process movement resulting in either of the two limits being expanded. Use of the above-mentioned expanding limits within the integrated steady state optimizer 100 (described fully later) results in what is herein called "Asymmetrical Control Action" with interesting and unique consequences. Typically, when the process is being optimized with increasing throughput, the limits above will expand in one direction. For instance, increasing feed rate to the process will cause $h^o_{high}$ to decrease and $h^i_{low}$ to increase whereas $h^o_{low}$ and $h^i_{high}$ will remain unchanged resulting in a widening range. Although, further increase in throughput is limited by h/2, however, at any time, decrease in throughput is not restricted by the same amount but the full extent of range resulting in an asymmetrical control action.

This ability to perform asymmetrical control action is significant in that although the process would be optimized gradually as limited by the controlled imbalance limit h, however, if for any reason of constraint violation subsequently, the throughput is required to be reduced then the steady state optimizer would have the entire range of operation traveled thus far available to retract. This feature of the proposed invention is unique and novel that no other model predictive control technology implementation posses this asymmetrical control behavior. Typically, as practiced in the art, model predictive control application would produce equal but opposite control action. Consequently, one of the major deficiencies of performance of model predictive control as practiced in the art is that the tuning of it for optimization and steady operation would limit it to respond decisively for severe disturbance or constraint violation. The invention presented herein clearly overcomes this shortcoming. This behavior is illustrated by Case Study 8 presented below.

The above method of expanding Controlled Imbalance Limits is also applicable to the material balance inequality as described by eqn 3.3.1 and 3.3.2 in exactly the same manner.

Figure 22:
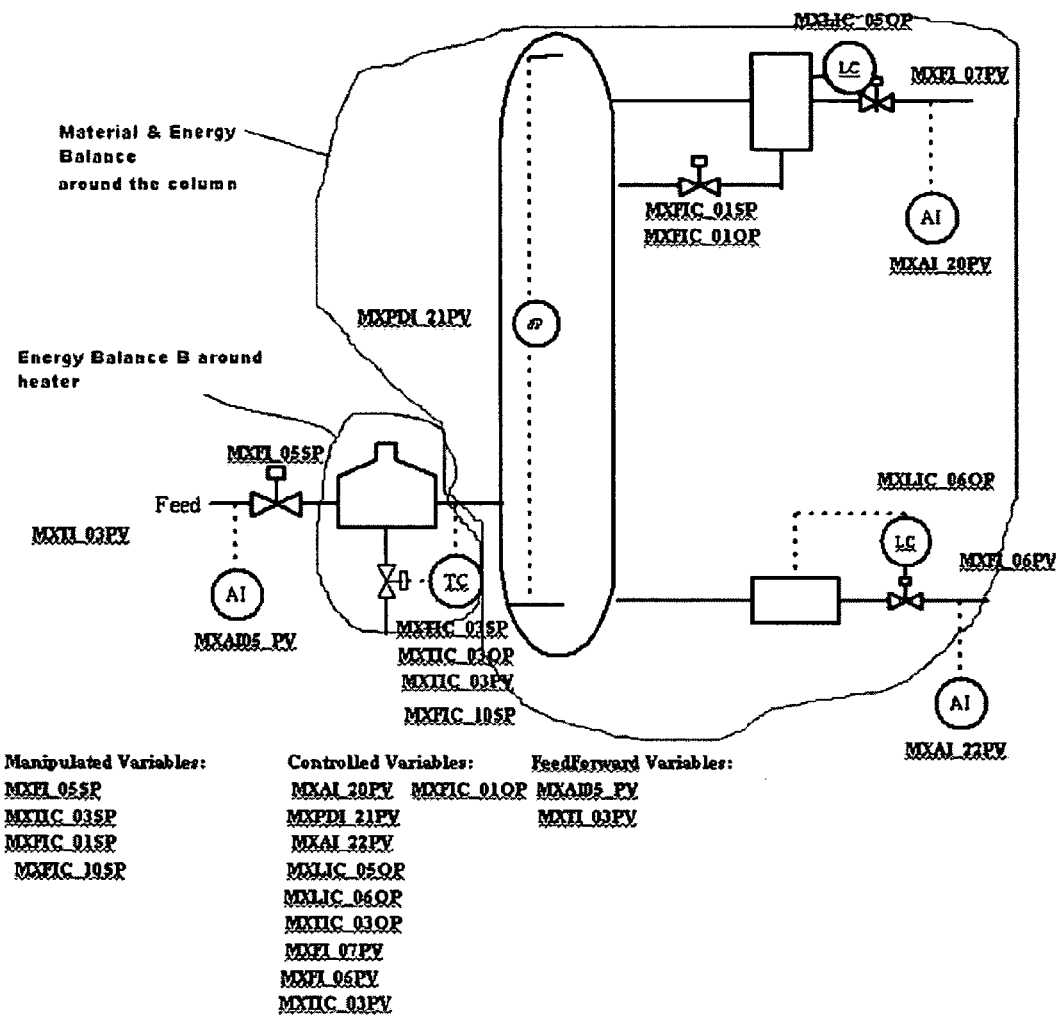
FIG. 22 Case Study 7: Process schematic: Material Balance and Heat Balance for a flash column FIG. 23 Case Study 7: Integrated Modular Model Predictive Controllers—MX-MPC-A details FIG. 24 Case Study 7: Integrated Modular Model Predictive Controllers—MX-MPC-B details FIG. 25 Case Study 7: Integrated Modular Model Predictive Controllers—Controlled Variables of MX-MPC-A & MX-MPC-B Performance details FIG. 26 Case Study 7: Integrated Modular Model Predictive Controllers—Manipulated Variables and Feed Forward Variables of MX-MPC-A & MX-MPC-B Performance details
Figure 25:
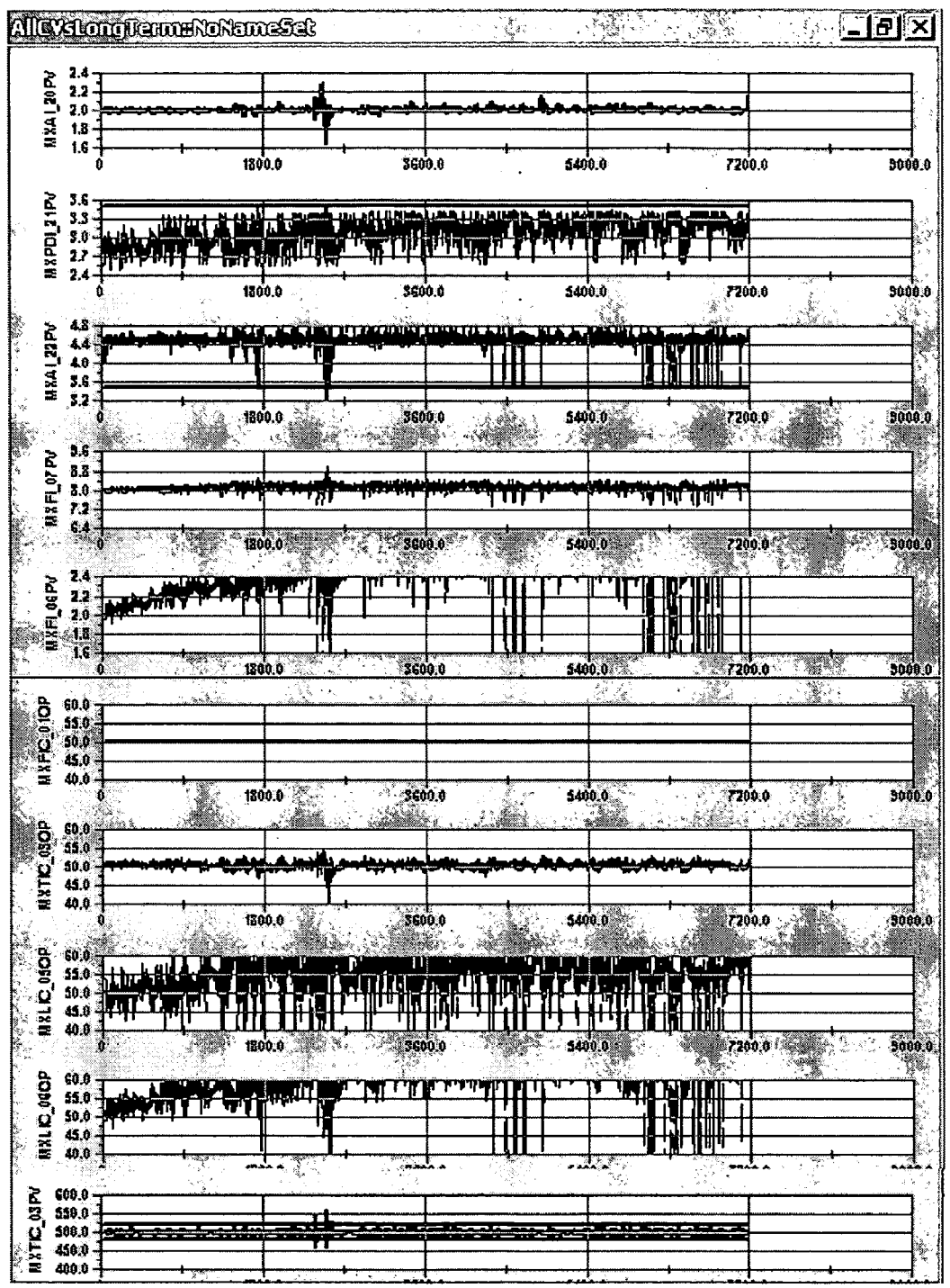
Figure 26:
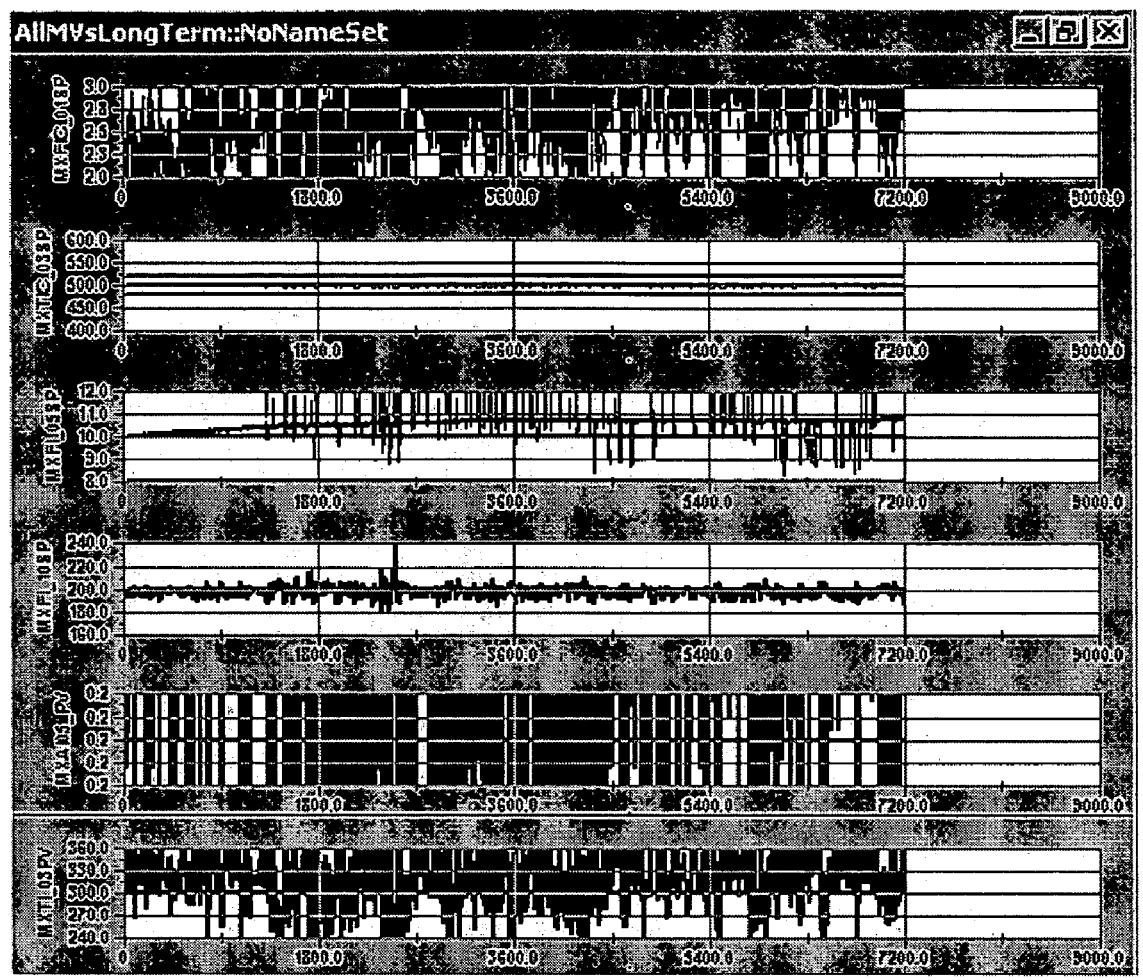

In its simplest form and as an example, though not limited by it, in reference to FIG. 22, $H_i$ is defined as $$H_i = Cp^* F^* T_i + k^* F_u \quad\quad 3.5$$

Where, Cp is Specific heat of the process stream,
F is flow rate of the process stream
$T_i$ is inlet temperature
k is calorific value of fuel
$F_u$ is fuel rate.
Similarly, $H_o$ is defined as $$H_o = Cp^* F^* T_o \quad\quad 3.5.1$$

Where,
$T_o$ is outlet temperature of the process stream

Eqns 3.5 and Eqn 3.5.1 being non-linear eqns in F and T, implementation of the eqn 3.3.1 in a linear optimizer such as linear programming, will require a linearization, such as follows $$\Sigma Ho = \Sigma(CpF\,T_o + CpT_oF) \quad\quad 3.5.2$$

Where, $T = T_o^* - T_o, F = F^* - F$

T* refers to Optimization Variable at new steady state
$T_o$ refers to Optimization Variable at steady state as projected at time i (current)
F* refers to Optimization Variable at new steady state
F refers to Optimization Variable at steady state as projected at time i (current)
Steady state optimizer will seek to determine optimal value of T* and F*.

Eqn 3.5 although non-linear in F and $T_i$ it need not be linearlized in the same manner because $T_i$ being a feed forward variable it will not be affected by the optimizer. However, if this was part of an integrated upstream process then $T_i$ would not be a feed forward variable, and hence eqn 3.5.1 would need to be linearlized.

For the sake of exposition, eqn 3.5.1 will be examined further later for its use within the integrated control system of FIG. 27 employing a three level optimization. Depending on the process configuration and availability of adequate process measurements, any one or more of the three variant of "Controlled Imbalance" eqns 3.4, 3.4.1 and 3.4.2 can be used to varying degree of effectiveness. For instance, in the least, for most part, heat outflow from a heat furnace is measurable and therefore 3.4.1 can be used.

These "Controlled Imbalance" constraints permit a slow but controlled movement of material and energy through the pertinent boundary and across the neighboring boundaries by way of steady state optimization as performed by steady state optimizer 100. Steady state optimizer 100 with all of the interconnected boundaries is able to determine optimal flows of material and energy across the process as whole as well as individual sub-processes among the interconnected modular MPCs. In principle, by following the method presented as per the invention, this effect of stable and controlled movement of material and energy can be accomplished for any process configuration 200 as depicted in FIG. 1. By manipulating the permitted imbalance parameter, h the rate of movement of material and energy can be varied by the operator based on the understanding of intrinsic material capacity and energy (heat) capacity distributed across the entire process chain. Case study 7, described later clearly illustrates this embodiment of the invention.

Eqn 3.5 above is meant to illustrate one particular form of energy balance. In a more general form, energy balance in general and heat balance in particular will involve process variables such as flow rate, composition, pressure, temperature etc which are well known in the field of chemical engineering, mechanical engineering, electrical engineering. Those of ordinary skills in these fields of engineering would be familiar with and have knowledge and understanding to formulate energy balance and set up the appropriate constraints as outlined above within the steady state optimizer.

Those of ordinary skills in the art would appreciate that eqns 3.4 through 3.5 as constraints can be included along with other constraints for constrained steady state optimization. Ordinarily, these eqns would be function of manipulated variables and/or controlled variables including feed forward variables pertaining to the modular MPC with known parameters such as calorific value of fuel gas etc.

It is recognized that under dynamic condition, the steady state optimizer 100 cannot satisfy either material balance constraints or energy balance constraints or both at all times. In which case, these constraints are "relaxed" temporarily just enough to permit a feasible state optimizer solution. The new value of h required to just satisfying any of the material/energy balance constraints is determined. Let this new value of "h" be termed as hr.

The steady state optimizer solution determined is implemented consistent with the permitted imbalance, h value. Thus, speed of optimization for each of the balance constraints is determined as follows, SpeedOfOptimization, $S=h/h_r$.  3.6

The variables participating in the controlled imbalance will be moved at the constraint speed, S. A variable participating in more than one controlled imbalance will therefore, be moved at the minimum of the constraints speed. Thus, even when under severe dynamic imbalance condition, the variables move will be constrained. This in turn insure that overall stability of the process remain intact. Speed of optimization of the variables, which are not part of the controlled imbalance, remain unaffected. This means that optimization speed of individual variables within a controller will vary depending on the extent of the imbalance constraints.

Thos of ordinary skills in the art would appreciate that dynamic move calculation for each of the modular model predictive controller of FIG. 1 is done separately and independently whereas steady state optimization is done all together. However, depending on the state of each of the sub-processes, the rate at which steady state optimization is pursued for the variables could be at different values. This particular feature of the proposed invention is unique in that it permits different rate of disturbance absorption for each of the MX-MPCs. Thus, part of the overall process where the disturbances are strong and heavy, a low speed of optimization would be pursued whereas the part of the process where it is less, a high speed of optimization would be pursued but importantly without compromising overall stability of the process. Consequently, the part of process which is more stable may attain its steady state target sooner but would effectively have to slow down to let the less stable part of the process to catch up depending on how it is connected to the less stable part of the process.

By use of speed of optimization, all of the variables (manipulated variables as well as controlled variables) involved in the specific material and/or energy balance move at the same speed. That is to say, the changes in value of these variables are coordinated.

The above stated equations relating to Material and Energy Balance can be applied across the entire process unit as well as sub-boundaries within the process unit forming Material Balance Nodes (such as around a level controller) and Energy Balance Nodes (such as a Temperature Controller). All of these material balances and energy balances can explicitly be included as "Controlled Imbalances" as a set of constraints within the steady state optimizer.

One set of process constraints, which are the most problematic for Model Predictive Controllers, relates to what is termed herein as "Valve/Control Output Constraints". Typically, a MPC will manipulate flow set points, temperature control set point, and pressure set points. In which case, the controller needs to ensure that the lower level controllers remain controllable. That is to say, their outputs do not saturate. When output of a lower level controller such as a flow controller or a temperature controller saturates, the lower level controller loses its ability to control its controlled variable. In order to prevent this from happening, a MPC will incorporate along with other controlled variables these outputs as additional set of controlled variables that are to be controlled within the set low and high limits. In a conventional MPC implementation, for this, the controller will consists of a set of process response models for each of these outputs with respect one or more of the manipulated variables.

Keeping the lower level outputs within the range is first of all important for operating the process safely and second of for operating the process at or very near to the optimal conditions. For real time optimization, the valve outputs limits represent the real operating limits beyond which the process cannot be optimized further nor operated safely.

In particular, flow control valve output process response tends to be non-linear and noisy. This makes the control of such valve outputs problematic. The method disclosed in this invention offers a way of eliminating Valve/Regulatory Control Output (otherwise called herein as "Controller Output Variables"). The controller output variables relating to the variables participating in the material/energy balances can be removed from the calculation of dynamic move calculation.

By definition, controller output variables such as flow controller output, temperature controller output etc is one way or another dependent on other non-output variables, and therefore they can be eliminated from the dynamic move calculation. This is possible because the steady state targets of other non-output variables will be sufficient for the dynamic move calculation. Moreover, since, by definition of the method used in the present invention (viable material and energy balance), all other non-output related variables would be sufficient to define the controller output related variables. The controller output variables are needed in the steady state optimizer in so far as to characterize explicitly actual process limits such as maximum rate of fuel rate, maximum product rate, and maximum feed rate etc. but not really needed as such for the dynamic move calculation in accordance with the method disclosed in this invention.

Effect of any saturation of controller output variables would be reflected in the material/energy balance causing them to deviate from the "Controlled Imbalance" limits of h mentioned above. This in turn, would require the controller actions to bring the "Controlled Imbalance" to within the limits. For instance, when a fuel gas valve output saturates (see Example later), the heat balance around the heater would begin to deviate from the limits. The MX-MPC would then reduce the feed rate to the unit to bring the "Heat Balance" within the limits, which in turn would relieve the fuel gas valve saturation. It is possible to envisage a situation where such a process could be controlled adequately solely with the proper set up of heat balance constraint without requiring the fuel gas valve position included in the controller. Therefore, controller output variables are not strictly needed in a MX-MPC. However, in practice they are included in a Mx-MPC for the sake of practical reasons for the purpose of steady state optimization though not for dynamic move calculation. Controller output variables are intrinsically related to variables in material/energy/heat balances and therefore, they are not directly needed except as secondary constraints for steady state optimization.

Unstable processes are hard to control. Errors involved in the calculation of the controller moves can amplify process instability. When a process is unstable, the imbalance in its material and/or energy balance would be that much greater. Imbalance of the material balance and/or energy balance is therefore a measure of instability of the process. By controlling the imbalance of material balance and energy balance within the range as determined by the physical characteristics of the process, the invention proposed herein offers a direct method of controlling stability while optimizing. By controlling speed of optimization as proposed above, the process is allowed to return within acceptable tolerance of instability. A decrease in optimization speed permits would be otherwise aggressive controller actions to be slowed down and at the same time let the process itself to regain its stability.

A number of case studies comparing performance MPC (prior art) with MX-MPC based on the invention is made for an example process unit. The results with the proposed invention are labeled as MX-MPC and as practiced in the art is labeled as MPC. These case studies are meant to demonstrate illustrative applicability of the method presented in this invention across a range of situations but not limited to them. Those of ordinary skill in the art will appreciate the extent of applicability of the method presented herein in a variety of situations that could be construed based on the description of the method presented herein.

In FIG. 4, a schematic diagram of the process used for the case studies to follow is shown. The table in FIG. 5 summarizes 3 manipulated variables, I feed forward variables and 9 controlled variables used in the comparative studies.

In case of as practiced in the art, no material balance or heat balance mentioned above are included. The economic pricing used in both the cases is the same. However, for as practiced in the art, the tuning weights are set manually both for the controlled variables and the manipulated variables.

Figure 6:
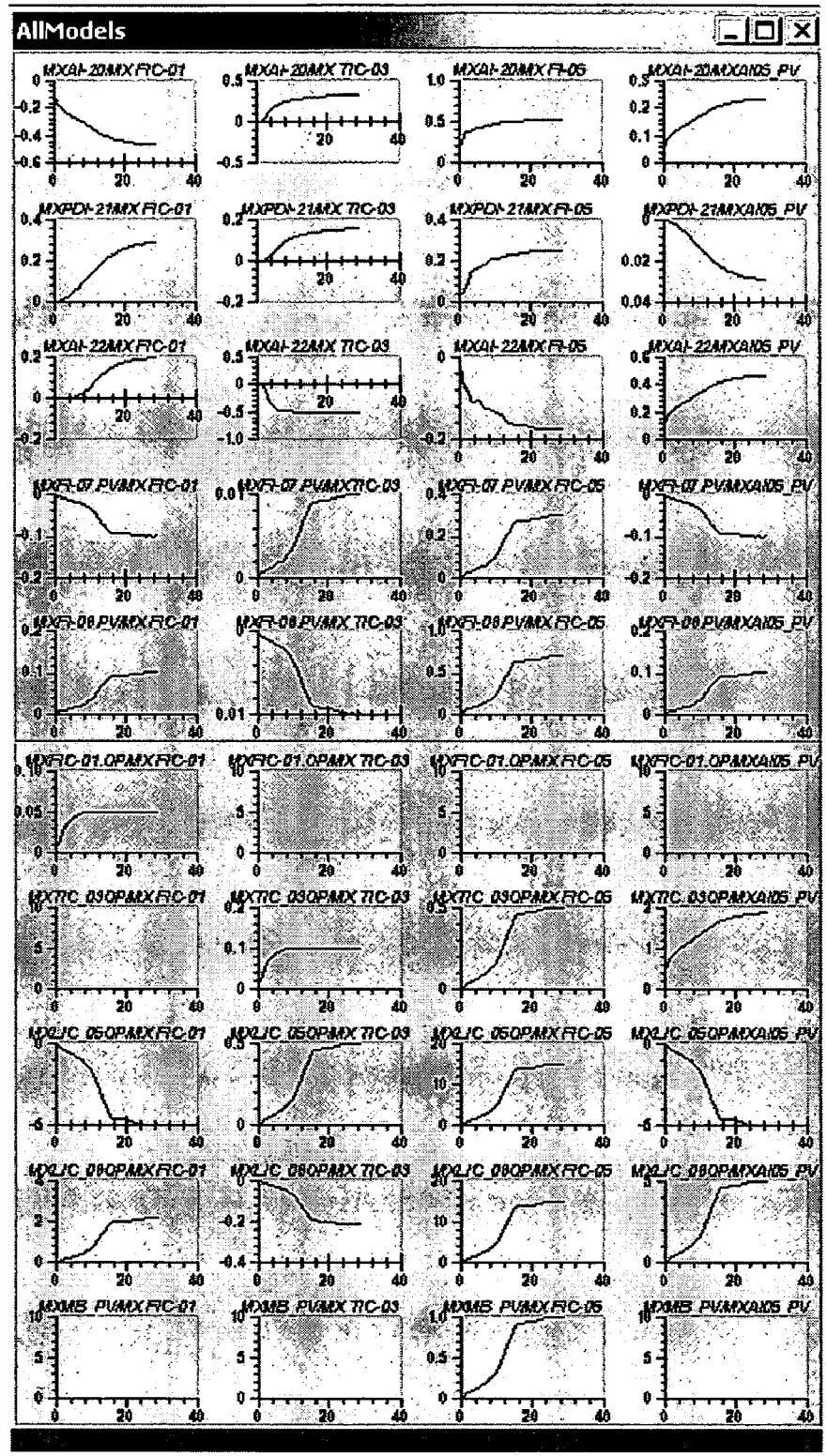
FIG. 6 Typical Process Response Models for a Flash Column in FIG. 4
Figure 8:
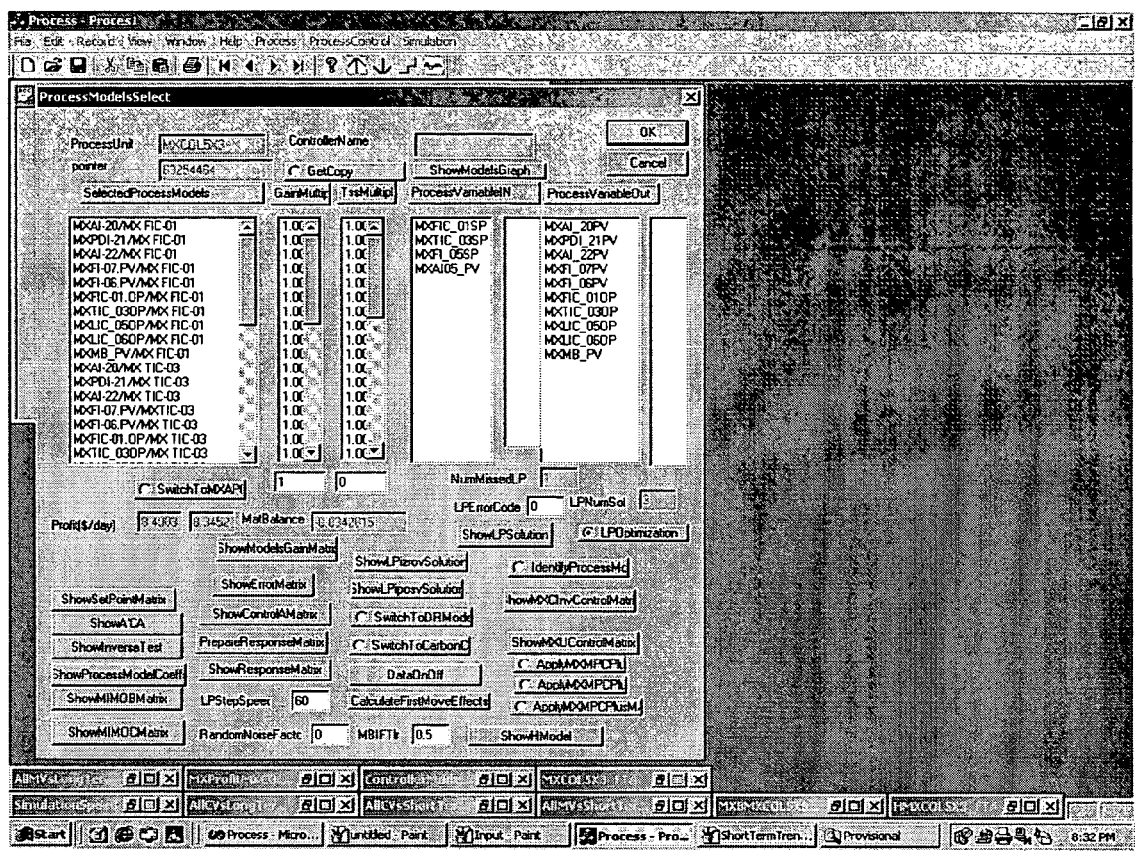
FIG. 8 Case Study 1: Data Continued
Figure 9:
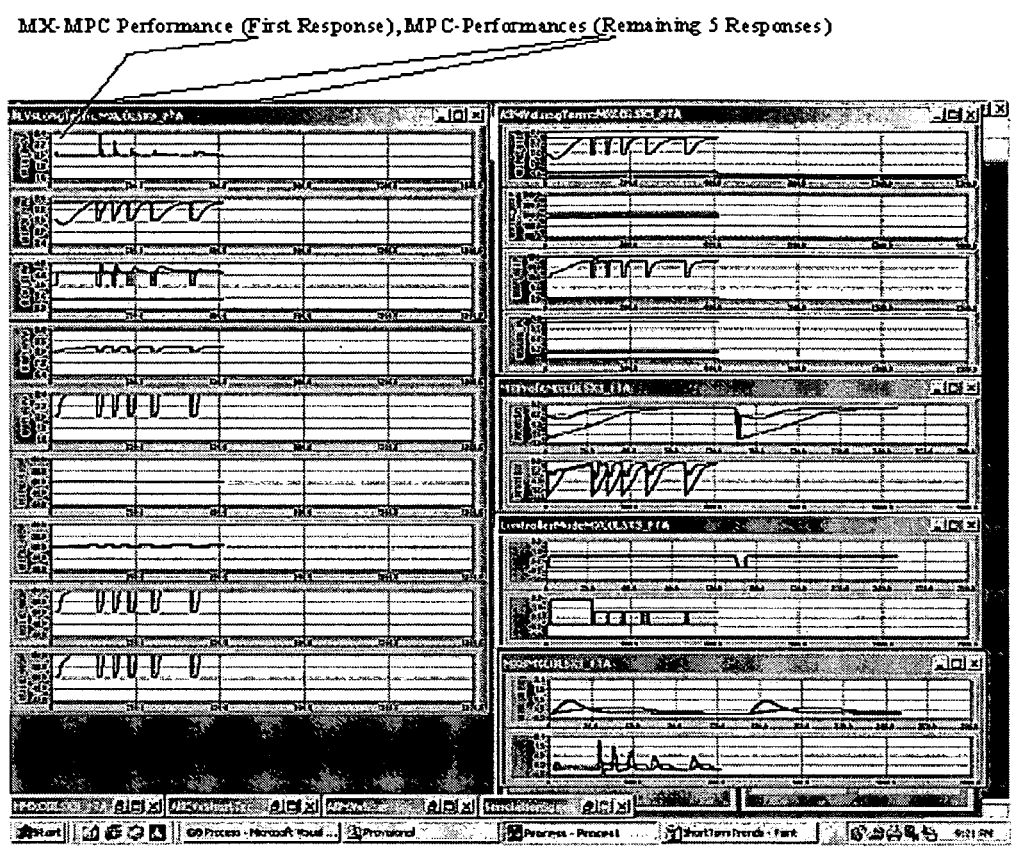
FIG. 9 Case Study 1 Results: Comparison of Performance of MX-MPC with MPC
Figure 10:
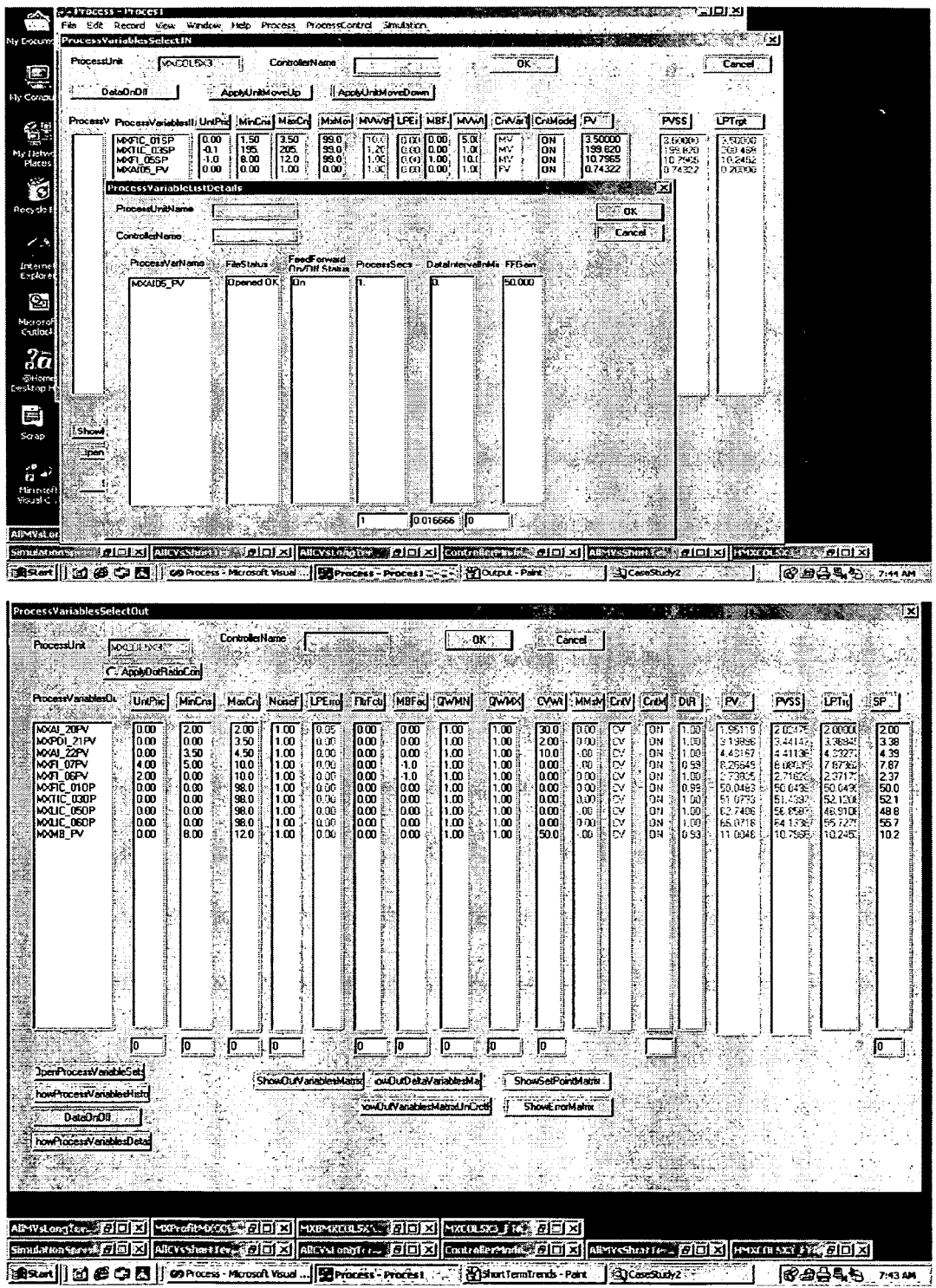
FIG. 10 Case Study 2 Data
Figure 11:
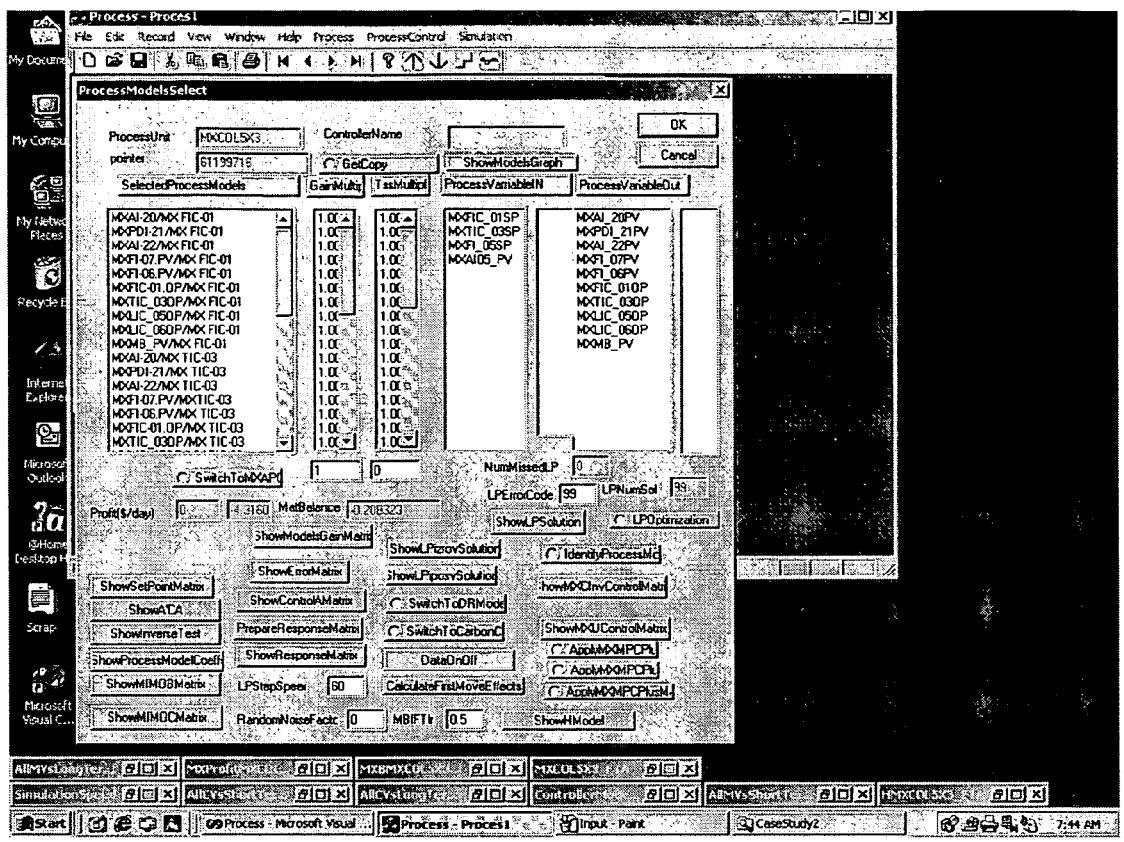
FIG. 11 Case Study 2 Data Continued
Figure 12:
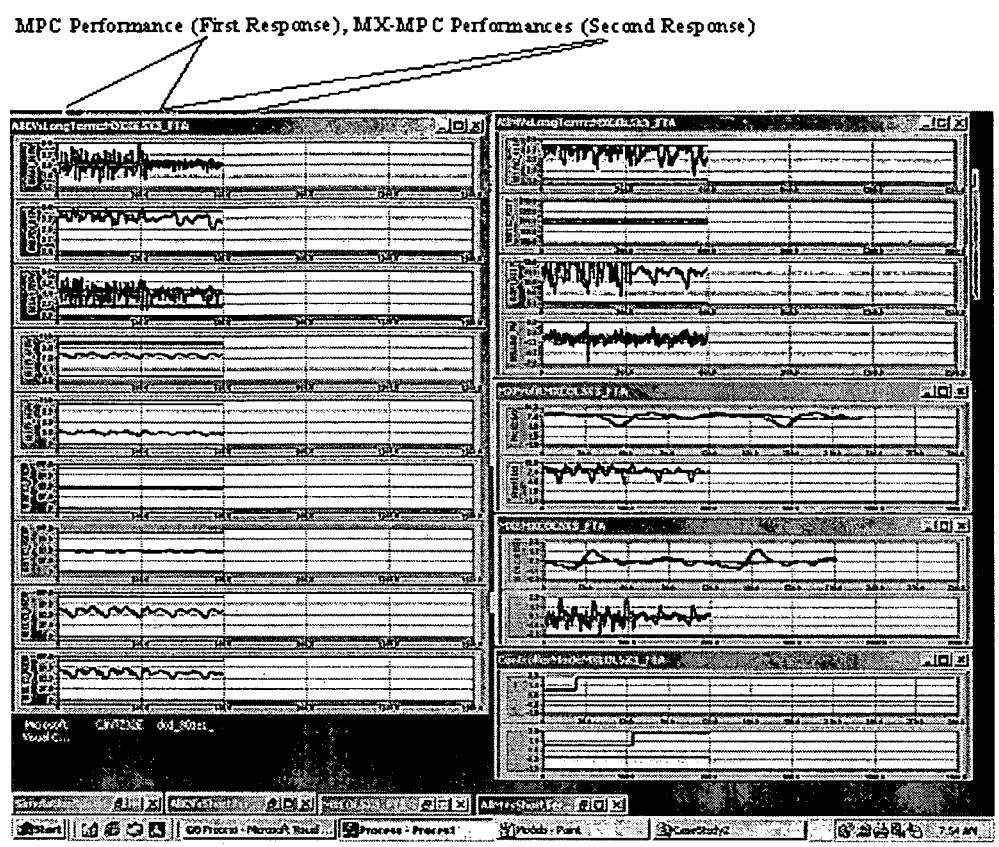
FIG. 12 Case Study 2: Results: Comparison of Performance of MPC and MX-MPC
Figure 13:
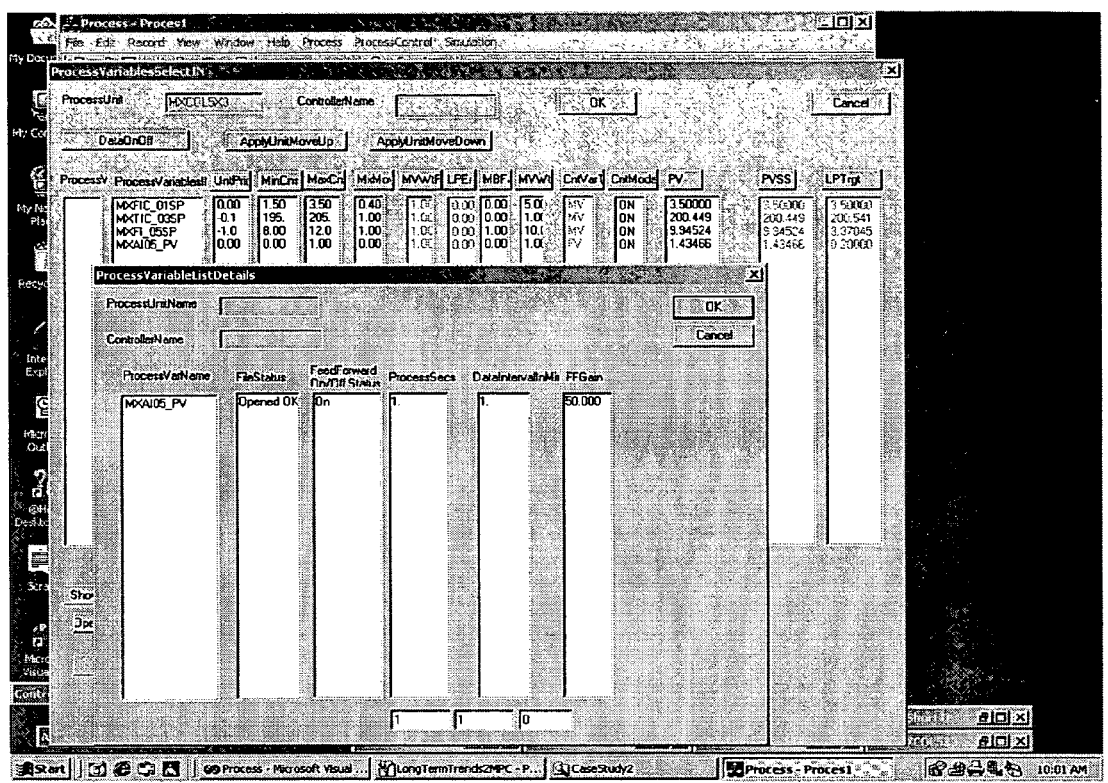
FIG. 13: Case Study 3: Data
Figure 15:
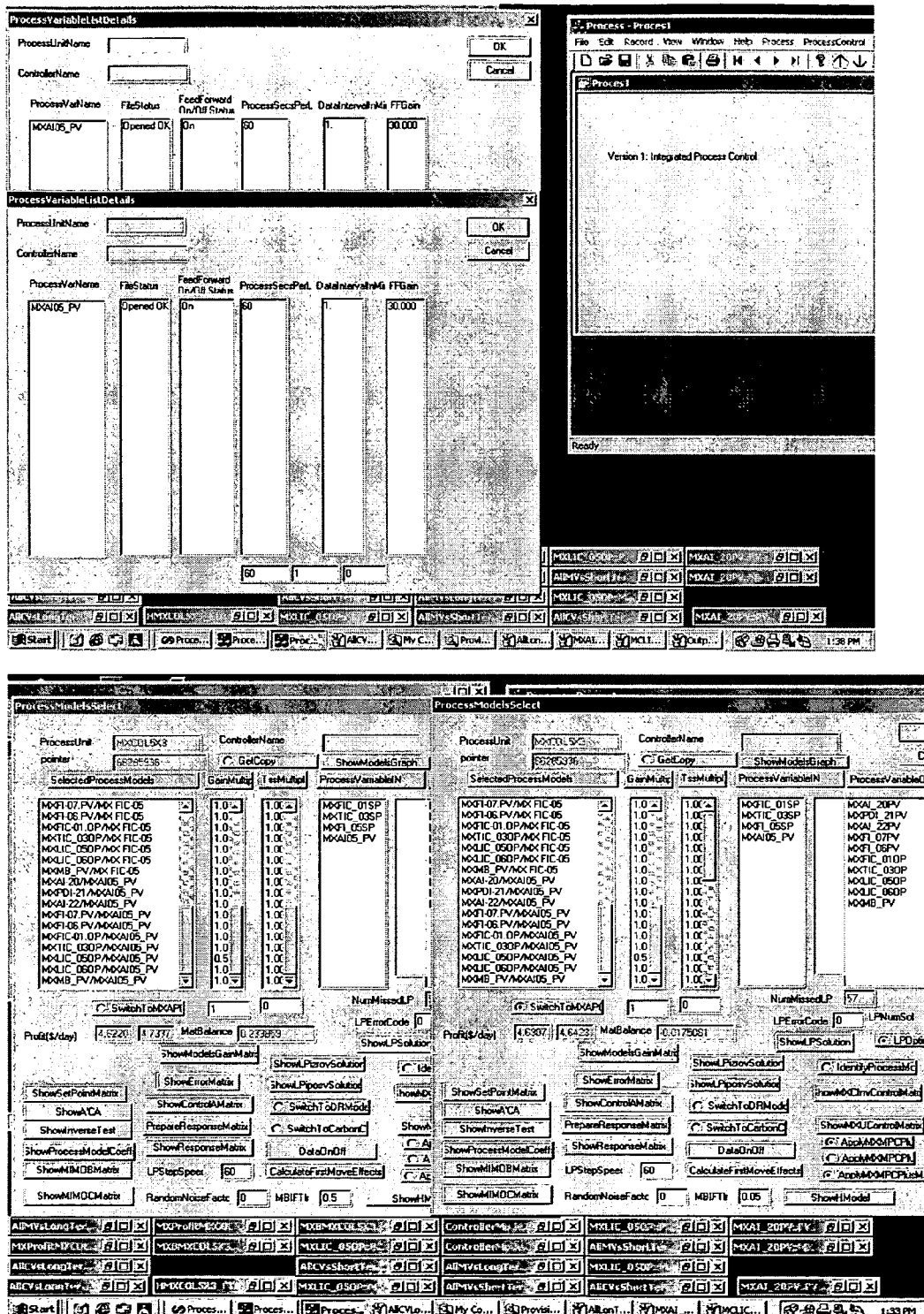
FIG. 15 Case Study 4: Data
Figure 18:
FIG. 18 Case Study 5: Results: Comparison of Performance of MPC and MX-MPC
Figure 21:
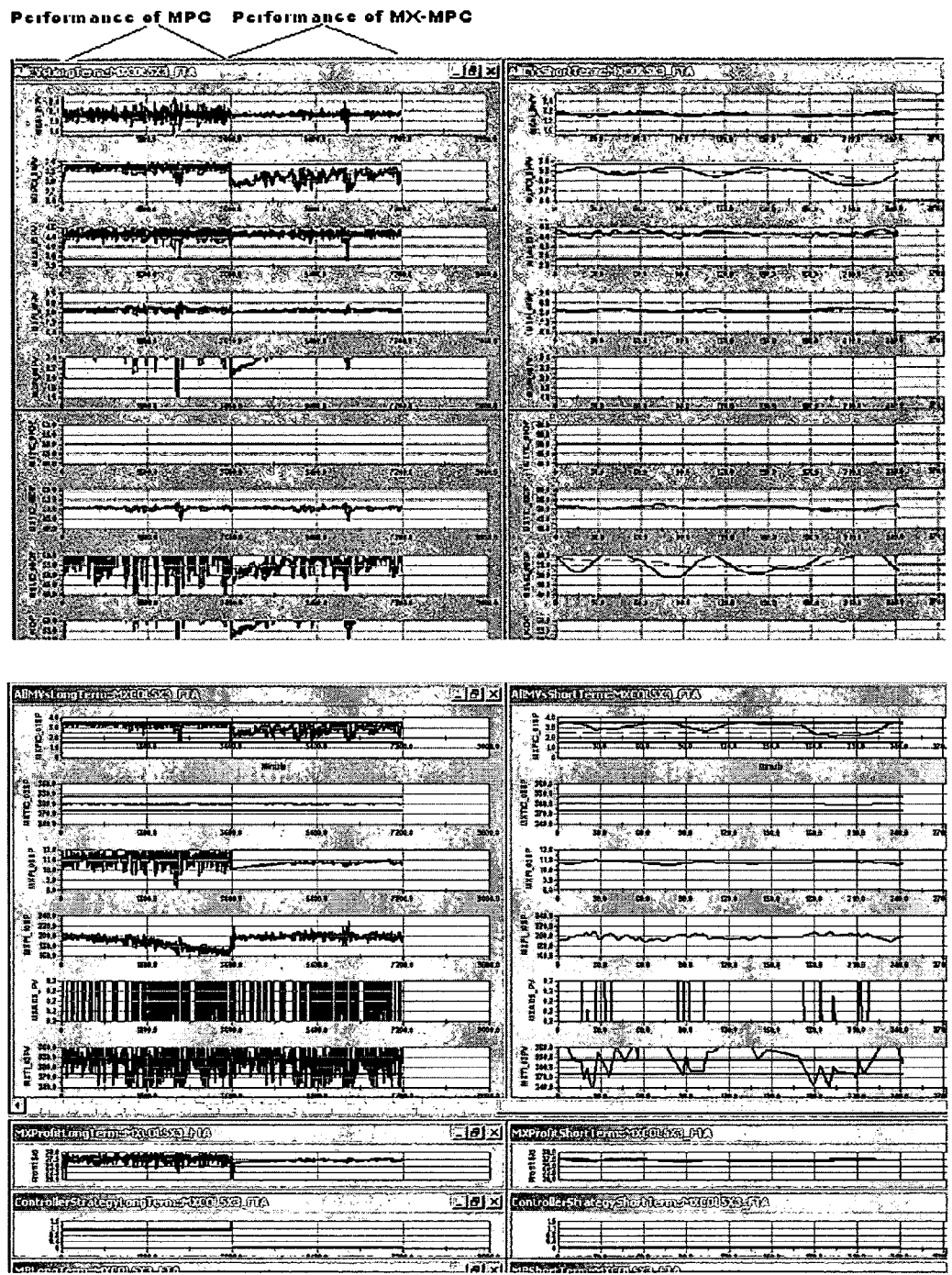
FIG. 21 Case Study 6: Results: Comparison of Performance of MPC and MX-MPC

FIG. 6 includes all of the process dynamic models required for this example under the proposed method of MPC. In FIG. 6, includes all of the process dynamic models required for this example under conventional MPC. Notice that the later has more process dynamic models than the former as it includes additional models for controller outputs.

From the material balance standpoint, the MPC has all of the variables required do an explicit and complete material balance. Thus, the variables constitute a viable material balance boundary for this example. As practiced in the art, not all of the controlled variables in the case of MPC would be included in the controller. For instance, typically controlled variable CV4 and CV5 would ordinarily be not included. However, herein for the comparison these two variables are included for completeness.

The tuning values and the constraints are set exactly same in both MPC and MX-MPC cases except for the differences highlighted in the table above. The results used in this comparison are produced using a proprietary simulation package from LSI Optimal Inc. Princeton, N.J.

The simulation package from LSI Optimal Inc, offers simulation of a multi-variable model predictive controller incorporating as practiced in the art control strategies. The package utilizes two sets of response models, one for simulating actual process responses and another for prediction of actual process responses used in the controller. By changing the response models used in the prediction of actual process response in the controller, the simulation package creates what is generally known as "Model Mismatch error" for the controller.

The results depict trend for each of the controlled variables, manipulated variables and feed forward variable along with the profit value. Case Studies 1–5, relates to comparison of as practiced in the art controller with as proposed by the invention incorporating explicit material balance. Case Study 6 compares performance of as practiced in the art controller with as proposed by the invention incorporating an explicit material balance and heat balance. As shown, the performance of the controller as proposed by the invention is much superior and stable than as that of as practiced in the art controller. Case study has a slightly different process configuration as per the table mentioned therein. All data and results pertaining to the case studies are shown in FIG. 7–26 as labeled.

Case Study 1: No Model Mismatch, No Feed Forward Variation Change of Constraints: This case study demonstrates the basic performance difference between MPC and MX-MPC in that the latter achieves the same overall steady state with minimal violation of the controlled variable constraints. Notice the response of the profit value in both the cases. In case of MX-MPC, the response is well behaved with little overshoot while keeping all of the controlled variables within their respective limits.

The first response shown in the results is from MX-MPC. The remaining results are from MPC runs in which the tuning was varied to match the results from MX-MPC run. As shown, after five changes to the tuning, MPC does not match as well with the results of MPC. In conclusion, performance of MPC cannot be matched to performance of MX-MPC by simply changing its tuning.

Case Study 2: No Model Mismatch, With Feed Forward Variation No Change of Constraints: This case study demonstrates the improved performance of MX-MPC to feed forward variable variation as compared to MPC. The underlying tuning is same in both the cases except for the additional constraints and controlled variable for MX-MPC. Performance of MPC is shown first, followed by performance of MX-MPC in the results are presented in FIG. 10–12.

Case Study 3: Same as Case study 2 with lower frequency of feed forward variable Variation: This case study demonstrates that while MPC's performance degrades considerably requiring retuning whereas MX-MPC's performance practically remains unchanged. This proves that MX-MPC posses more robust towards feed forward variable variation than MPC.

Case Study 4: Same as Case Study 2 with model mismatch: A model mismatch is created by making the response model used in the controller to have lower gain for the controlled variable CV9 and Feed forward variable, FV1. The model used in the controller is set to ¼ of the actual process gain. Once again, performance of MPC degrades considerably whereas performance of MX-MPC remains unchanged except for an initial period following the change in model gain.

Case study 5: Same as Case study 4 with Noise added to CV9 process variable measurement: Once again, performance of MPC degrades considerably whereas performance of MX-MPC remains practically unchanged.

Results of case study 4 & 5 taken together illustrate what happens with the MPC as practiced in the art. The level control output models are notoriously unreliable due to the non-linear nature of the phenomena involved. MX-MPC with its elimination of the output model remains more robust and unaffected by change in model gain.

Case Study 6: Inclusion of Feed Inlet Temperature as Feed Forward Variable: In the scope of the controller used, in Case Studies 1–5, an additional feed forward temperature is included, namely feed inlet temperature. Variation in feed inlet temperature would require adjustment to heat input to the feed heater regulating the feed outlet temperature. A localized heat balance node is considered incorporating feed rate, feed inlet temperature, feed outlet temperature and fuel gas. Note a slight change in process configuration for this case from the previous cases. FIG. 7 depicts new configuration.

This case study includes Heat Balance (as representation of energy balance) and Material Balance. The Heat Balance applies to feed pre-heat temperature controller. This includes Feed flow, feed inlet temperature (now included as an additional Feed Forward Variable in addition to feed quality), feed outlet temperature and fuel gas to the feed heater. The results of comparison of performance of the controller as practiced in the art and of the proposed using explicit material and energy balance are shown below. Once again, the performance of the controller with explicit Energy and Material balance as per the invention is found much superior to the controller as practiced in the art.

A generalized architecture of Large Scale Integrated Optimization and Control using MX-MPCs as per the invention is shown in FIG. 1. An example process involving two sections of it as shown in FIG. 7 will be used for illustration of the proposed invention. The overall method of building large-scale optimization and control is as follows:

Identify an overall viable material/energy balance boundary for large scale integration;
Identify and build Modular Model Predictive Controllers within the scope of the large-scale integration sought encompassing sub-viable material/energy boundaries;
Inter-connect individual Modular Model Predictive Controllers as per the method presented in this invention.

The boundary within which the integration is sought must constitute a viable material/energy balance as defined earlier above. In a green field situation, this boundary would need to be selected to contain the number of modular model predictive controllers that would be identified and developed later. In the situation where, the modular predictive controllers already built then the integration boundary is simply what would be constituted by the inter-connection of the component modular MPCs. If the existing MPCs do not constitute viable material/energy balance then the necessary corrections would be made to arrive at a viable material/energy balance boundary.

For the purpose of exposition of this, we will use the process unit shown in FIG. 2 of a flash column. As shown in FIG. 1, there are no viable material/energy balance boundaries shown for the process. In FIG. 4, based the proposed modular model predictive controller design, two viable material/energy balance boundaries are identified, one relating to overall material and energy balance for the column and another relating to energy balance around the feed heater temperature control. In the meaning of the modular model predictive controller, as shown in FIG. 4, there are two viable material/energy balance boundaries.

There are two alternate ways to build modular model predictive controllers for the process shown in FIG. 4, one modular model predictive controller incorporating the two viable boundaries or two separate modular model predictive controllers, each incorporating one of the viable boundaries. For the purpose of exposition of the present invention, we will use two separate modular model predictive controllers case. These two modular model predictive controllers configurations is as follows.

| | | MX-MPC A + B: One Large MX-MPC | | |
|---|---|---|---|---|
| LogicalName | ProcessVariable | Description | | EngUnit |
| | Manipulated | | | |
| MV1 | MXFIC_01SP | Top Reflux Flow Controller Set Point | | MBLD |
| MV2 | MXTIC_03SP | Feed Temperature Controller Set Point | | deg F. |
| MV3 | MXFI_05SP | Feed Flow Controller Set Point | | MBLD |
| MV4 | MXFI_10SP | Fuel Rate to Heater | | MFT3HR |
| | FeedForward | | | |
| FV1 | MXAI05_PV | Feed Quality | | % mole |
| FV2 | MX_TI03PV | Feed Inlet Temperature | | deg F. |
| | Controlled | | | |
| CV1 | MXAI_20PV | Overhead Product Purity | | % mole |
| CV2 | MXPDI_21PV | Column Pressure Differential | | psia |
| CV3 | MXAI_22PV | Bottom Product Purity | | % mole |
| CV4 | MXFI_07PV | Top Product Flow | | MBLD |
| CV5 | MXFI_06PV | Bottom Product Flow | | MBLD |
| CV6 | MXFIC_01OP | Top Reflux Flow Controller Output | | % |
| CV7 | MXTIC_03OP | Feed Temperature Controller Output | | % |
| CV8 | MXLIC_05OP | Top Level Controller Output | | % |
| CV9 | MXLIC_06OP | Bottom Level Controller Output | | % |
| CV10 | MXTIC_03PV | Feed Output Temperature | | deg F. |

| | | MX-MPC B: Modular MPC for Main Column | | |
|---|---|---|---|---|
| LogicalName | ProcessVariable | Description | EngUnit | Comments |
| | Manipulated | | | |
| MV1 | MXFIC_01SP | Top Reflux Flow Controller Set Point | MBLD | |
| MV2 | MXTIC_03SP | Feed Temperature Controller Set Point | deg F. | |
| MV3 | MXFI_05SP | Feed Flow Controller Set Point | MBLD | |

MX-MPC B: Modular MPC for Main Column

| LogicalName | ProcessVariable | Description | EngUnit | Comments |
|---|---|---|---|---|
| | FeedForward | | | |
| FV1 | MXAI05_PV Controlled | Feed Quality | % mole | External Feed Forward |
| CV1 | MXAI_20PV | Overhead Product Purity | % mole | |
| CV2 | MXPDI_21PV | Column Pressure Differential | psia | |
| CV3 | MXAI_22PV | Bottom Product Purity | % mole | |
| CV4 | MXFI_07PV | Top Product Flow | MBLD | |
| CV5 | MXFI_06PV | Bottom Product Flow | MBLD | |
| CV6 | MXFIC_01OP | Top Reflux Flow Controller Output | % | |
| CV7 | MXTIC_03OP | Feed Temperature Controller Output | % | |
| CV8 | MXLIC_05OP | Top Level Controller Output | % | |
| CV9 | MXLIC_06OP | Bottom Level Controller Output | % | |

MX-MPC A: Modular MPC for Feed Temperature Heater

| LogicalName | ProcessVariable | Description | EngUnit | Comments |
|---|---|---|---|---|
| | Manipulated | | | |
| MV1 | MXFI_10SP | Fuel Rate to Heater | MFT3HR | |
| | FeedForward | | | |
| FV1 | MXTIC_03SP | Feed Temperature Controller Set Point | deg F. | Internal Feed Forward |
| FV2 | MXFI_05SP | Feed Flow Controller Set Point | MBLD | Internal Feed Forward |
| FV3 | MX_TI03PV Controlled | Feed Inlet Temperature | deg F. | External Feed Forward |
| CV1 | MXTIC_03PV | Feed Output Temperature | deg F. | |

In the table above, MX-MPC A+B would be one large modular MPC for the process shown in FIG. 4. For the same process, MX-MPC-A and MX-MPC-B would be two separate MX-MPCs that would require integration to effectively be same as Mx-MPC A+B.

Inter-connection of MX-MPCs is achieved by matching feed forward variables of a MX-MPC to another neighboring MX-MPC in the same process variable appears as either a manipulated variable or a controlled variable. If no neighboring matching process variable is found for a feed forward variable of a MX-MPC then the feed forward variable is considered as an "external" feed forward variable. If a matching process variable is found then the feed forward variable is considered as an "internal" feed forward variable.

As shown above, for MX-MPC B, there is no internal feed forward variable whereas for MX-MPC A, there are two internal feed forward variables which have the two matching manipulated variables in MX-MPC B, namely MV1 and MV2.

Note that MX-MPC A+B, has no internal feed forward variable and its number of manipulated variables equal sum of manipulated variables of MX-PC A and MX-MPC B. Similarly, MX-MPC A+B, has the number of controlled variables as sum of number of controlled variables of MX-MPC-A and MX-MPC B. Finally, MX-MPC A+B has number of external feed forward variables as sum of number of external feed forward variables of MX-MPC-A and number of external feed forward variables of MX-MPC B. This is to say integration of adjacent modular MX-MPCs result in the integrated MX-MPC to have the correct size and scope as one single MX-MPC. Thus, sum of (neighboring) MX-MPCs result in one MX-MPC as if it was configured as a whole. In other words, integration of neighboring MX-MPC is seamless and consistent. This provides for an automatic integration of MX-MPCs based on the connecting internal feed forward variables.

Next, via the above-mentioned connection of internal feed forward variables, the integrated MX-MPC acquires an important property of the maintenance of overall stability of the process without any further changes to the configuration or addition of the variables.

As a MX-MPC, each of the controllers in the integrated MX-MPC possesses the important property of maintenance of stability due to the material balance/energy balance within its own scope. The connecting of internal feed forward variables essentially interconnects the material/energy balances across the MX-MPCs boundaries.

By virtue of the modularity of MX-MPC, interconnecting of a number of MX-MPCs is easy and straightforward as stated above based on internal feed forward variables matching. However, more importantly, by virtue of having at least one material balance/energy balance the interconnected MX-MPCs become as consisting of interconnected material/energy balances. The interconnected material/energy balance paths determine the various stability constraints on the overall process unit. The alternate stability path permit the integrated Mx-MPC to feed the most optimal path to overall profitability while maintaining parts of the process pertaining to each of the MX-MPCs to remain stable within their own limits.

The interconnectivity of MX-MPCs permits integration across the process units as well as integration within a process unit across the various process sections including towards lower level controller such as regulatory controller for temperature or level control; MX-MPC-A is an example of the later. In principle, this method of integration would permit building of a large-scale optimization and control system in a consistent manner ensuring overall stability of operation and yet delivering overall optimal performance.

The modularity of integration proposed by the invention permits individual smaller MPCs to participate in a wider optimization and control scheme without incurring the increase in size penalty for control matrix of the dynamic move calculation. This means larger integrated Mx-MPCs can be built without incurring computational penalties of increased dimensionality of overall scope.

Case Study 7: Integrated Modular Model Predictive Controllers: This case study demonstrates performance of integration of two modular predictive controllers corresponding to MX-MPC-A and MX-MPC-B as described above. The results shown in FIG. 22–26 show the integrated modular MPC works well. This case demonstrates that two modular MPC can be integrated for steady state optimization but perform independently for dynamic move calculation.

Figure 27:
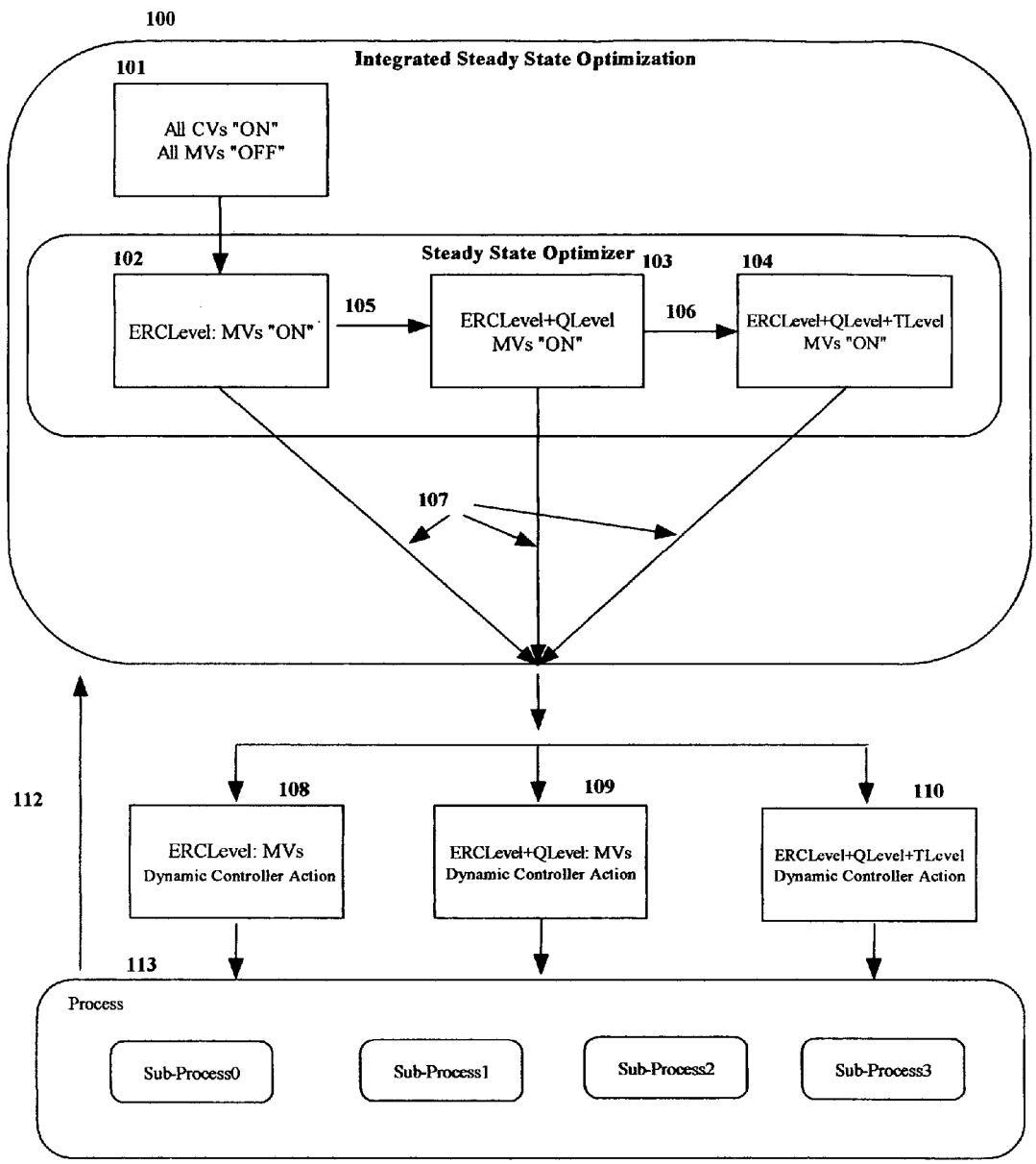
FIG. 27 is a block diagram of operation of Integrated Control System with 3 levels FIG. 28 Case Study 8 Results of Integrated Control System

Description-FIG. 27 Additional Embodiments

Another embodiment of the present invention incorporates a three level optimization and control architecture that is designed to deliver sustained and robust closed loop performance of small as well as large modular model predictive controllers. The overall optimization and control problem is cast into a three level structure, consisting namely of hereon called Embedded Regulatory Control Level, Quality Control Level and Throughput Level. A detailed description of operation of this is given below.

At the base level, the architecture incorporates what is termed herein "Embedded Regulatory Controllers" ("ERC"), for manipulated variables relating to set point changes, such as temperature set point, pressure set point etc. This level is designed to ensure that the manipulated variables process value is tightly controlled to its set point. This is a self-consistent level in that it includes the ERC output as constraint with built-in what is described herein as "Manipulated Variable Set Point Tracking" when its output saturates.

The basic goal of this level is to control the process state variables such as temperature, pressure, and level tightly to their respective set point value as targeted by overall optimization such that next level, namely quality control level optimization can be performed reliably. For this, the manipulated variables pertaining to ERCMV are primarily allowed to be changed at this level in order to satisfy the MV.PV-MV.SP constraint as needed taking into account the effects of the relevant measured disturbance variables while all other manipulated variables remain pinched at their current value.

As practiced in the art, in a MPC involving manipulated variable set point, the regulatory controller relating to controlling the manipulated variable process value (pv) to its set point (sp) remains external to the MPC. The manipulated variable controller output is included in the MPC for ensuring that the manipulated variable set point is not moved beyond the operability range of the regulatory controller. For this, all of the models relating to effect of other manipulated variables of the MPC on this manipulated variable controller output variable are also included. The method of embedding regulatory controller as outlined herein eliminates the requirement of having the manipulated controlled variable controller output models with respect to all other manipulated variables. Instead, one and only one manipulated variable controlled model is required to be included of that with respect to the manipulated variable set point.

Further, ERC as stated herein and illustrated can be applied in a recursive multi-level manner. For example, for a hydro cracker unit in a refinery, a higher level EMC would include what is generally known as Weighted Average Inlet Temperature ("WAIT") involving multiple reactor inlet temperature controllers. In this respect, each of the reactor inlet temperature controller forms lower level ERC with respect to WAIT control which in turn forms next level up ERC with respected to overall integrated control system for the hydro cracker unit. The proposed integrated control architecture presented herein is capable of handling such interrelated two level ERCs.

Similarly, in another application situation involving multiple process units, ERC can be applied as it relates to one specific process unit. For example, in a refinery involving multiple processing units such as Crude Unit, Fluidized Catalyst Cracking Unit, and Reformers all feeding to a light ends unit for recovery of products from the off-gas from each of these units. The light ends unit can be considered as an Embedded Process Unit even though it is a full-fledge integrated modular model predictive controller. The integrated control system for the multi-processing units would include the light ends unit as an ERC.

Those of ordinary skills in the art would appreciate the general and recursive application of ERC within an integrated control system presented herein.

This level pertains to optimizing process operations within the constraints at current feed (throughput) rate. This level acts as a bridge between ERC level and Feed Level (see below). It will respond to actuator saturation pertaining to ERC level and in particularly to MVSP tracking actions performed by the ERC level. It will optimize overall process profit within the entire constraints sets at current feed rate. In other words, it keeps the process under control while maximizing profit where possible by manipulating all variables except for the feed to the unit.

In solving the optimization problem at QLevel, the results of ERCLevel are kept intact as needed. In other words, the solution at Qlevel essentially extends beyond what is achieved at ERCLevel.

Feed rate and its quality are considered the most significant variables to affect overall control and optimization of a process. For the purpose of exposition of the invention, though not limiting its applicability, feed quality is considered more of a feed forward variable and not a directly manipulated variable. Thus, from hereon, feed quality will be included in the description as a feed forward variable. Feed rate is therefore, the primary feed related variable thus affecting overall optimization and control of the process.

The feed level optimization and control will push the process further from the quality control level attainment. Again, in doing so, all of the constraints set are dealt with in their entirety. As in the case of Qlevel, at Tlevel, the results of optimization from Qlevel remain intact and further optimization is sought to optimize the throughput.

In most significant way, feed rate affects both controllability and limitations to optimization. Feed rate affects directly and indirectly almost all aspects of operation of a process unit. Therefore, in the proposed architecture, feed control level is where ultimately all constraints resolution is made. In terms of pushing the process towards higher profitable operation, feed control level determines the stable direction of improvement leading to the its maximum value. However, in entirely opposite way, feed control level is where the process operations are brought within safety constraints and equipment constraints decisively and aggressively. This particular aspect of Feed Control level action as presented by this invention is most strikingly different from any other optimization and control schemes hitherto known.

The proposed architecture for optimal control presented herein exhibits "asymmetrical" control actions, in that on pushing feed rate on upside, it keeps the entire process within the constraints in a stable and steady manner as the feed rate is increased. However, for any reason of constraint violation or change in constraint limit that requires an immediate reduction in feed rate then the proposed robust LSI optimal control will respond with adequate response, albeit at the rate much higher than the rate the feed rate was increased on the upside. Thus, the proposed robust LSI optimal control offers a much stable environment for increasing feed but is not unduly constrained by that when it comes to protecting the process safety and equipment limit.

For the sake of exposition, a simple case of application of the integrated steady state optimizer depicted in FIG. 27 is described below. Those of ordinary skills in the art would appreciate the general applicability of the method described herein below. As depicted in FIG. 27, the overall Integrated Steady State optimization solution process is composed of three distinct steps, 102–104. Each of these three steps is described below.

In the operation of the integrated steady state optimizer 100 in FIG. 27, manipulated variables and controlled variables are categorized as follows.

A manipulated variable is said to be of Embedded Regulatory Control type if a control action on it relates to a change in its set point. In turn, a change in its set point involves actuation of another controller set point or control valve position and a dynamic transient of its process value in attaining to its set point value. In turn, the actuating action element is termed as Embedded Regulatory Control Manipulated Variable Manipulated Variable (i.e. ERCMV.MV). ERCMV.MV itself may be of ERCMV type leading to penultimate control valve action. For most part, application relating to model predictive control involves manipulated variable action via change in its set point. An example of an ERCMV is temperature set point and its MV is fuel gas set point. Flow control set point is therefore of ERCMV type but with fast transient in that for all practical purposes a change in its set point for control cycle period is not of consequence. It is really ERCMV with transient greater than the control cycle period is of consequences. Hereon, for the purpose of exposition and brevity, flow control set point related manipulated variables would not be explicitly dealt with. However, in principle they can be dealt with in the same manner. Therefore, ERCMV are further categorized as of:

Type 0: with no set point change but direct valve position actuation

Type 1: with set point change with fast transient with respect to control period Type 2: with set point change with slow transient with respect to control period Further, a manipulated variable is categorized as follows:
Quality related type if it affects quality related controlled variables described below. An example of quality related manipulated variable would be reflux flow in a distillation column.

Throughput related type if it relates directly to steady state material balance; for example feed rate is both quality related and throughput related but would be considered primarily as throughput related because in the optimization solution process adopted here, throughput related manipulated variables are required to be considered last.

A controlled variable is said to be of quality/Operability related type if it either relates directly to an outflow stream from the process or affects operability of the process and hence affecting quality related controlled variables. An example of quality related controlled variable would be percent impurity in overhead product steam of a distillation column. Whereas, an example of operability related controlled variable would be pressure differential across a distillation column. Process value relating to an ERCMV would not be categorized as quality related. Instead, it would be referred to as ERCMV.PV.

Therefore, an ERCMV controller is a modular model predictive control as described herein primarily to control process value of the ERCMV to its set point value involving one manipulated variable and possibly feed forward variables.

Integrated steady state optimizer 100 in FIG. 27 is run at every control cycle. At the start, all of the controlled variables are included in the optimization problem solution but not any of the manipulated variables. As depicted in FIG. 27 and described further below, manipulated variables are progressively included and removed as the optimization solution progresses from 102 to 104.

At 102 in FIG. 27, all of the manipulated variables related to the embedded regulatory controllers are included for the steady state optimization solution. If the optimization at 102 results in a feasible solution then the optimization process proceeds to 103 with those ERCMVs whose controller performance is evaluated to be satisfactory, whereas those ERCMVs whose controller performance is not satisfactory are excluded from the next stage optimization solution.

In 103, the manipulated variables related to control of quality variables and other operability variables but excluding those manipulated variables relating directly to throughput are additionally included for the optimization solution process. Similarly, at end of 103, the quality the manipulated variables quality related controlled variable's variance is found to be in excess of permitted tolerance then all of the manipulated variables affecting it are removed from further optimization process. The optimization solution then proceeds to 104 where a feasible and optimal solution is sought with the manipulated variables not excluded thus far.

At end of 102 or 103 when there are no manipulated variables to carry forward, then the optimization process ends via 107 in either case. At 102, if optimization solution is found to be infeasible, an attempt is made to perform what is described herein as "Manipulated Variable SPPV Tracking" to yield a feasible solution albeit with the manipulated variable range pinched. That is to say, the ERCMV.SP is allowed to track its current value and the controlled variables prediction affected by this is updated and the manipulated variable range is correspondingly pinched for the proceeding solution process.

As shown in FIG. 27, it is possible in certain situation, because of severe instability of the process under control, all of the ERCMVs fail the stability test and therefore, the optimization solution process does not proceed to 103. Instead, it is short-circuited via 107. This is to say; the instability of the process is so wide spread as to not meaningful to perform any optimization further. Similarly, for the same reason, at 103, the optimization solution process is short-circuited via 107.

In proceeding through the three stages of the overall optimization solution process outlined above, the steady state material balance and steady state energy balance pertaining to the sub-processes are included with appropriate adaptations in view of the manipulated variables status as being included or not included in the optimization solution process.

Inequality Controlled Imbalance Constraints relating to material/heat balance mentioned above are suitably adapted to work within the three level optimization process of FIG. 27. As an example of this, eqn 3.5.2 is shown below for its adaptations. Basically, the adaptation relates to the manner in which the variables F and $T_o$ are allowed to vary as follows:

ERCLevel: F is fixed, $T_o$ refers to its pv value, thus reducing eqn 3.5.2 as $$\Sigma H_o = \Sigma(CpFT_o) \qquad 3.5.3$$

Qlevel: F is fixed and $T_o$ refers to its sp value, thus reducing eqn 3.5.2 as $$\Sigma H_o = \Sigma(CpFT_o) \qquad 3.5.4$$

Tlevel: F and $T_o$ refer to their sp value $$\Sigma H_o = \Sigma(CpFT_o + CpT_oF) \qquad 3.5.5$$

For each ERCMV, its controlled variable constraint is formed as pv-sp with the high low limit set at small value representing acceptable tolerance of its deviation from the set point. Thus at 102, an ERCMV itself is considered to be not in the problem solution but its process value as pv-sp constraint. Of course, the manipulated variable relating to ERCMV is included in the problem solution. For instance, at 102, ERCTC.SP is not included in optimization solution but a constraint of TC.PV-TC.SP is included along with fuel gas set point assuming that fuel gas controller is not included as an ERCMV itself. Use of pv-sp of the ERCMVs allow for elimination of all but one model of its controller output in a model predictive controller. Only model that is required within the integrated control system 100 is that of manipulated variable control output with respect to manipulated variable set point. Infeasible solution due to pv-sp at 102 requires the ERCMV.SP to track its process value. The manipulated variable control output limits serves to limit the manipulated variable set point limits. Therefore, only one model of the manipulated variable control output is included in its ERC. This is very different from as practiced in the art, where the manipulated variable control output models are needed with respect to all other manipulated variables affecting. Since, the manipulated variables control output models tend to be non-linear and noisy, use of one and only model of it and that to with respect to its own manipulated variable set point basically removes a lot of what is generally considered to be in the art as "problematic/bad" models. Consequently, the integrated control system proposed herein would perform more robustly.

Thus, depending on the status of stability and feasibility of steady state of the process as whole as well as its sub-processes, the integrated steady state optimizer 100 will cause appropriate dynamic control move actions. The manipulated variables, which are found to fail the stability test in 100 would have their high/low limits pinched at current value and therefore would not be moved at this current control cycle. Whereas the other manipulated variables would be permitted normal dynamic move action. In other words, the actual dynamic move action by the controller would vary depending on the localized stability of each of ERCMVs and stability of quality related controlled variables.

One important advantage arising from the three level optimization steps as outlined above is that only one model of ERC manipulated variable control output is all needed. The only model needed is that of the ERC manipulated variable control output with respect to its set point change, which is easy, and well-defined model to obtain. In contrast, as practiced in the art MPC all of the models of the manipulated variable control output with respect to all of the manipulated variables affecting it are required. Typically, manipulated variable control output models tend to be of poor quality because of non-linear nature of the output behavior at or near its saturation and its measurement being noisy. By eliminating all but one models of the manipulated variable control output, the performance of the integrated control system becomes more robust and easy to maintain.

Figure 28:
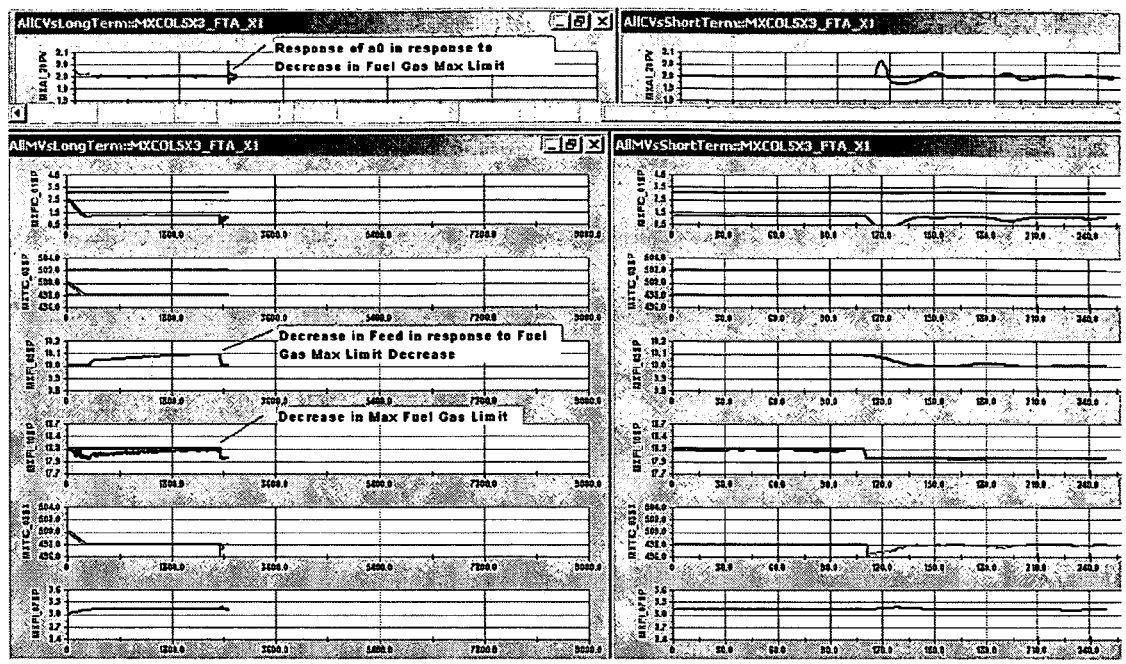

Case Study 8: In FIG. 28 results of application of the above-described integrated control system are shown for the same example process used previously. In this case, the integrated system consists of 3 ERCs, one relating to feed temperature, and two relating to accumulator level controllers. In addition, it included one more controller for the main flash column. As shown, feed rate increases in a steady manner with the quality variable a0 (overhead stream of the flash column) being at near perfect control with very little deviation from its high/low limit (high and low limits are at 2.0). The fuel gas limit is gradually approached to its maximum limit. Following a decrease in the fuel gas max limit, feed rate is cut at much higher rate than the rate at which it was increased earlier. The quality variable, a0 shows an increased deviation from its limit but still well under control. The fuel gas being a manipulated variable, it had to be moved down immediately causing the quality control a0 to deviate. This example clearly illustrates "Asymmetrical Control Action" behavior as expected from the invention.

Applicability of the Invention

As practiced in the art, performance of MPC in real plant situations has been less than desirable. Stability of actual plant operation using MPC has greatly limited the extent of real optimization. Consequently, the scope and size of MPC in use are limited. The invention described in this document greatly improves on the stability of operation and thus deliver a higher extent of real optimization. Both the scope and size of MX-MPC can be greatly increased without significant loss of overall optimization. Explicit use of material and energy balance provides a basis for increasing scope and size of MX-MPCs within a plant without undue burden of complexity and maintenance efforts.

This ability to preserve the stability of operation with integrated MX-MPCs will enhance the utility of the advanced level control for supporting plant wide real time non-linear optimization applications.

The improved stability of operation resulting from the application of the method disclosed in this invention would mean greater degree of robustness of performance in general and in particular from the elimination of controller output variables from the dynamic move calculation.

The manner of integration proposed by the invention will permit a seamless expansion of application of MX-MPCs across the process units. Overall-stability of the process operation is minimally affected by an individual MX-MPC's performance. This will greatly simplify the efforts to maintain and operate multiple MX-MPCs. For the purpose of greater scope of control, the invention proposed herein avoids building of a one large monolithic, difficult to maintain, unwieldy MPC.

The combined effect of the modular structure of the MPC as disclosed in this invention with explicit incorporation of material balance and energy balance will provide a direct and obvious method of plant wide application of optimization and control using MPCs.

Thus, a method for modular model predictive controller has been described. In addition, a method of integrated optimization and control of multiple modular predictive controllers has been described permitting building of a large-scale system. Although specific embodiments, including specific parameters, methods and equations haven been described, various modifications to the disclosed embodiments will be apparent to one of ordinary skill in the art upon reading this disclosure. Therefore, it is understood that such embodiments are merely illustrative of and not restrictive on the broad invention and that this invention not limited to the specific embodiments shown and described.

What is claimed is:

1. A method of specifying a model predictive controller for optimizing and controlling a process comprising the steps of:
   a) selecting a material balance and energy balance compliant process boundary for said process, containing measurements of process variables and other parameters including variables whose values are derived from said measured variables to calculate at least one of the combination of steady state material balance and steady state energy balance to varying degrees as appropriate, wherein said process variables further comprising plurality of manipulated variables, plurality of controlled variables and plurality of feed forward variables;
   b) incorporating controlled imbalance constraints of varying limits of change in said steady state balance explicitly in addition to the constraints generally of process variables included in steady state optimization;
   c) monitoring said process in steps a) and b) and optimizing using a steady state optimizer generating in response thereto, control data for optimizing and controlling said process; and
   d) expanding the limits of the controlled imbalance constraints relating to said steady state balance resulting in asymmetrical control action;
   whereby creating said model predictive controller that can be used for complete control cycle of said process involving start up, normal operation and shut down;
   whereby an engineer can interconnect said model predictive controllers in accordance with material and energy connectivity of adjacent said processes forming a large-scale robust modular model predictive controller system.

2. The method of specification recited in claim 1 wherein said varying degrees as appropriate range between complete steady balance and minimal steady balance depending on availability of measurements of said process variables.

3. The method of specification recited in claim 1 wherein said Controlled Imbalance constraints are further split into Controlled Imbalance constraints relating to inflows and outflows separately and varying limits range set by an operator.

4. The method of specification recited in claim 1 wherein said controlling said process comprising the steps of:
   a) monitoring said process and
   b) predicting and controlling said process with a dynamic controller in accordance with said control data.

5. The method recited in claim 4 wherein further comprising the steps of controlling said process relates to setting controller tuning values for the controlled variables of said controller is directly derived from said economic pricing used in said steady state optimization.

6. The method recited in claim 5 wherein further comprising the steps of setting controller tuning parameters for said manipulated variables using model gains of said process used in said controller.

7. The method recited in claim 4 wherein further comprising the steps of controlling relates to eliminating models of said controlled variables relating to control valve outputs and other non-product variables from said manipulated variables move calculations.

8. The method recited in claim 1 wherein said generating control data step comprises the step of using an optimization speed parameter.

9. The method recited in claim 8 wherein said optimization speed parameter is based on deviation of said steady state balance from said Controlled Imbalance constraints.

10. The method recited in claim 9 wherein further comprising the steps of assigning said optimization speed to only those controlled variables and manipulated variables which are directly involved in said steady state balance and to other interconnected manipulated variables and controlled variables.

11. The method recited in claim 10 wherein further comprising the step of determining minimum optimization speed for each of said manipulated variables and said controlled variables based on said optimization speed in claim 10 resulting from all of said steady state balances.

12. A method of operating an integrated control system for controlling and optimizing a process as a whole and its sub-processes, hereon known as wholesome process, comprising the steps of:
   a) monitoring said wholesome process, and generating using an integrated steady state optimizer for said wholesome process, in response thereto, control data for optimizing and controlling said wholesome process; and
   b) predicting and controlling said sub-processes with local dynamic controller of, to varying degrees, in accordance with said control data;
   wherein said integrated controlling and optimizing is dynamically determined in its scope and extent of optimizing and control action based on an explicit criteria of stability of each of said sub-processes and of process as a whole;
   wherein said dynamically determined scope and extent is done by a method of progressively expanding set of manipulated variables and controlled variables constraints for increasing scope of optimization based on said explicit criteria of stability of said sub-processes;
   wherein said local dynamic controller of said sub-process of step a) comprises the steps of: a) selecting based on said explicit stability criteria process boundary for each said sub-process, containing measurements of process variables and other parameters including variables whose values are derived from said measured variables to calculate said explicit stability criteria in at least one of the combination of said stability criteria to varying degrees as appropriate; and b) incorporating constraints of varying limits of change in said stability criteria explicitly in addition to the constraints generally of process variables included in steady state optimization.

13. The method of claim 12 wherein said generating step comprises the step of using an optimization parameter.

14. The method of claim 13 wherein said optimization parameter is based on the extent of violation of constraints for feasible solution.

15. The method of claim 12 wherein said varying degrees relate to the permitted variance of control deviation of said local dynamic controller.

16. A method of operating an integrated control system for controlling and optimizing a process as a whole and its sub-processes, hereon known as wholesome process, comprising the steps of:
  a) specifying modular model predictive controllers for each of said sub-processes;
  b) incorporating controlled imbalance constraints of change in said steady state balance of said modular model predictive controllers and process as a whole in addition to the constraints generally of process variables of sub-processes and process as a whole included for steady state optimization in one single integrated steady state optimizer;
  c) monitoring said wholesome process, and generating using said integrated steady state optimizer for said wholesome process, in response thereto, control data for optimizing and controlling said wholesome process; and
  d) predicting and controlling said sub-processes with modular model predictive controllers, varying degrees, in accordance with said control data;
  wherein said modular model predictive controllers of step a) comprises the steps of: a) selecting a material balance and energy balance compliant process boundary for each said sub-process, containing measurements of process variables and other parameters including variables whose values are derived from said measured variables to calculate at least one of the combination of steady state material balance and steady state energy balance to varying degrees as appropriate; and b) incorporating Controlled Imbalance constraints of varying limits of change in said steady state balance explicitly in addition to the constraints generally of process variables included in steady state optimization;
  wherein said integrated controlling and optimizing is dynamically determined in its scope and extent of optimizing and control action based on a multi-level of optimizing method comprising two or more levels.

17. The method of operation recited in claim 16 wherein said dynamically determined in its scope and extent of optimizing and control action is based on at least two levels of a three level optimizing method of said integrated system comprising of: a) first level hereto called as Embedded Regulatory Control level, comprising of Modular Model Predictive Controllers relating directly and specifically to manipulated variables set point and manipulated variables process value; b) second level hereto called as Quality Control Level, comprising of said Embedded Regulatory Control level in addition to controlled variables directly and specifically related to product qualities and operability limiting controlled variables, and all of the manipulated variables excluding those relating said sub-processes throughput and said process as a whole throughput; and c) third level hereto called as Throughput Level, comprising of said Embedded Regulatory Control Level and said Quality Control Level in addition to controlled variables and manipulated variables directly and specifically related to throughput of said sub-processes and said process as a whole.

18. The method of operation recited in claim 16 wherein further comprising adapting said Controlled Imbalance constraints of steady state balance of said sub-processes in accordance with said three levels of optimization.

19. The method of operation recited in claim 16 further comprising includes said steady state balance of said sub-processes and said process as a whole.

20. The method of operation recited in claim 16 wherein further comprising a generating step comprising the step of using an optimization parameter.

21. The method of operation recited in claim 20 wherein said optimization parameter is based on deviation of said steady state balance from said Controlled Imbalance.

22. The method of operation recited in claim 16 wherein said varying degrees relate to the permitted variance of control deviation of said sub-process controller.

23. A method of specifying a model predictive controller for optimizing and controlling a process comprising the steps of:
  a) selecting a material balance and energy balance compliant process boundary for said process, containing measurements of process variables and other parameters including variables whose values are derived from said measured variables to calculate at least one of the combination of steady state material balance and steady state energy balance to varying degrees as appropriate, wherein said process variables further comprising plurality of manipulated variables, plurality of controlled variables and plurality of feed forward variables;
  b) incorporating Controlled Imbalance constraints of varying limits of change in said steady state balance explicitly in addition to the constraints generally of process variables included in steady state optimization;
  c) defining each of said manipulated variables, controlled variables, and feed forward variables to a range selected from the group consisting of normal range, high penalty range, and low penalty range, wherein said normal range is the range in which said variable is required to be kept by an operator of the controller, said high penalty range is an extended range beyond a high limit of said normal range, said low penalty range is an extended range beyond a low limit of said normal range;
  d) characterizing each of said manipulated variables, controlled variables, and feed forward variables as either a product related variable or a non-product related variable;
  e) applying a penalty to each of said variable from step c) in said high penalty range and said low penalty range;
  f) applying an economic value for each of said product related manipulated variables, product related controlled variables, and product related feed forward variables from step d); and
  g) applying an economic value derived from an interconnected product related variable for each of said non-product related manipulated variables, non-product related controlled variables, and non-product related feed forward variables from step d).

24. The method recited in claim 23, wherein said model predictive controller further comprises an objective function J in the form of $J=p_i v_i$, wherein v is said process variable, and p is said economic value, wherein $v \geq 0$ and $V_{min} \geq V \geq V_{max}$, and wherein $V_{min}$ is said low limit of said process variable and $V_{max}$ is said high limit of said process variable.

25. The method recited in claim 24, wherein said constraints of step b) further comprising a Controlled Imbalance material balance constraint and an Controlled Imbalance energy balance constraint.

26. The method recited in claim 25, wherein said Controlled Imbalance material balance constraint is $-h^j \leq MB^j(v_m^j) \leq h^j$, wherein $j \geq 1$, $h^j$ is the amount of permissible controlled imbalance in the $MB^j$, and $v_m^j$ is a sub set of v relating to $MB^j$.

27. The method recited in claim 26, wherein said Controlled Imbalance energy balance constraint is $-h^k \leq HB^k(v_h^k) \leq h^k$, wherein $k \geq 1$, $h^k$ is the amount of permissible controlled imbalance in the $HB^k$, and $v_h^k$ is a sub set of v relating to $HB^k$.

28. The method recited in claim 27, wherein said Controlled Imbalance constraints of energy balance is further split into Controlled Imbalance constraints relating to inflows of energy and outflows of energy separately as $-h^j/2 <= \Sigma \Delta H_i <= h^j/2$ and $-h^j/2 <= -\Sigma \Delta H_o <= h^j/2$ respectively, wherein $\Sigma \Delta H_i$ is sum of change in all inflows of energy and $\Sigma \Delta H_o$ is sum of change in all outflows of energy.

29. The method recited in claim 25, wherein said Controlled Imbalance constraints of material balance is further split into Controlled Imbalance constraints relating to inflows of material and outflows of material separately as $-h^j/2 <= \Sigma \Delta Fi <= h^j/2$ and $-h^j/2 <= -\Sigma \Delta Fo <= h^j/2$ respectively, wherein $\Sigma \Delta Fi$ is sum of change in all inflows of material and $\Sigma \Delta Fo$ is sum of change in all outflows of material.

30. The method recited in claim 25 further comprising the steps of:

h) monitoring said process in steps a) and b) and optimizing to satisfy said material balance and energy balance constraints; and i) determining a MB and HB feasible solution, if step h) failed, by relaxing said constraint range of at least one of said controlled variables as necessary.

31. The method recited in claim 24, wherein said variables v are further classified as independent and dependent variables $[v]=[u,y]$, and where $y=g(u)$ and $g(\ )$ defines steady state changes in y for changes of u.

32. The method recited in claim 31, wherein step i) further comprising the steps of:

j) re-solving with said variable y set to about 0 to 999999, thereby resulting in a feasible optimal solution;

k) setting said constraint penalty range for each of said y variable with respect to the nearest limit to said optimal solution obtained;

l) re-solving using said set constraint penalty range from step k), and determining if the solution is feasible; and m) re-solving, if said solution in step l) fails, with both MB and HB relaxed, and then determining speed of optimization per said constraint limits $-h^j \leq MB^j(V_m^j) \leq h^j$, and $-h^k \leq HB^k(v_h^k) \leq h^k$.

* * * * *